Oct. 28, 1941.   C. H. CAUGHEY ET AL   2,260,558
ELECTRICALLY IGNITED MATCH HEADS AND METHOD OF MANUFACTURING THE SAME
Filed May 16, 1939    14 Sheets-Sheet 2
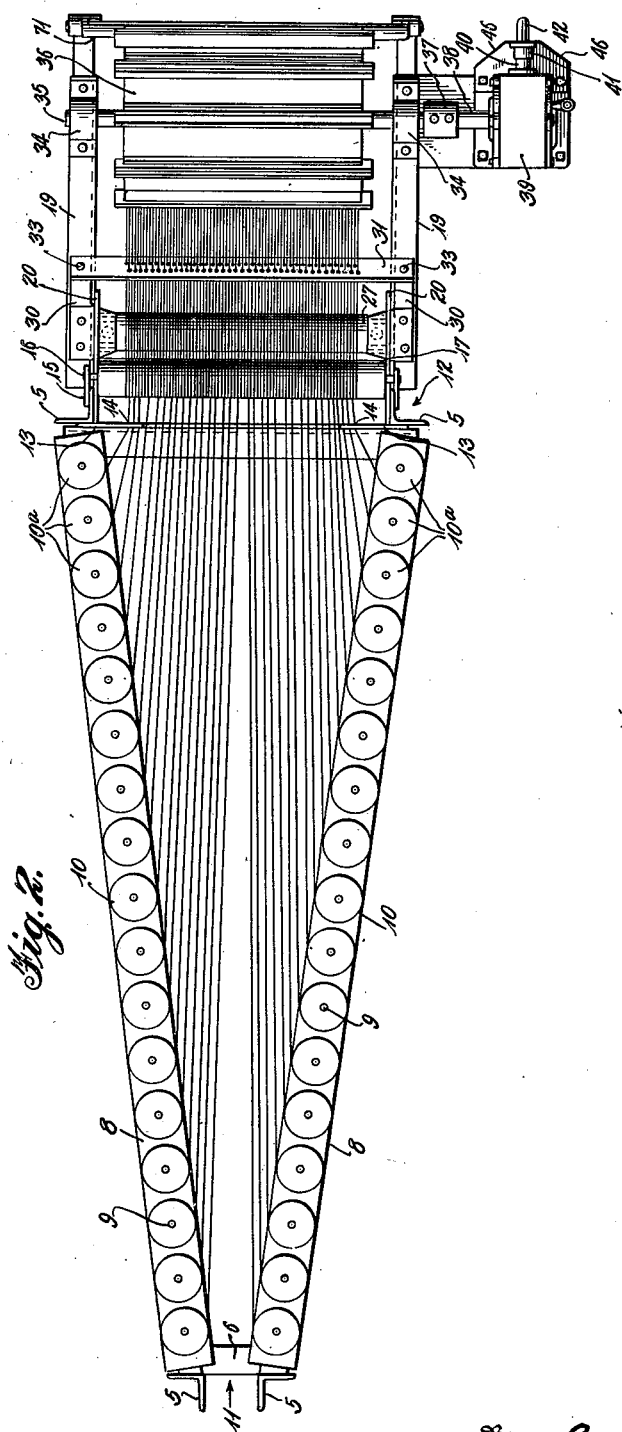
Inventors
Clarence H. Caughey and
Walter F. Mitcheltree
By L. Donald Myers
Attorney

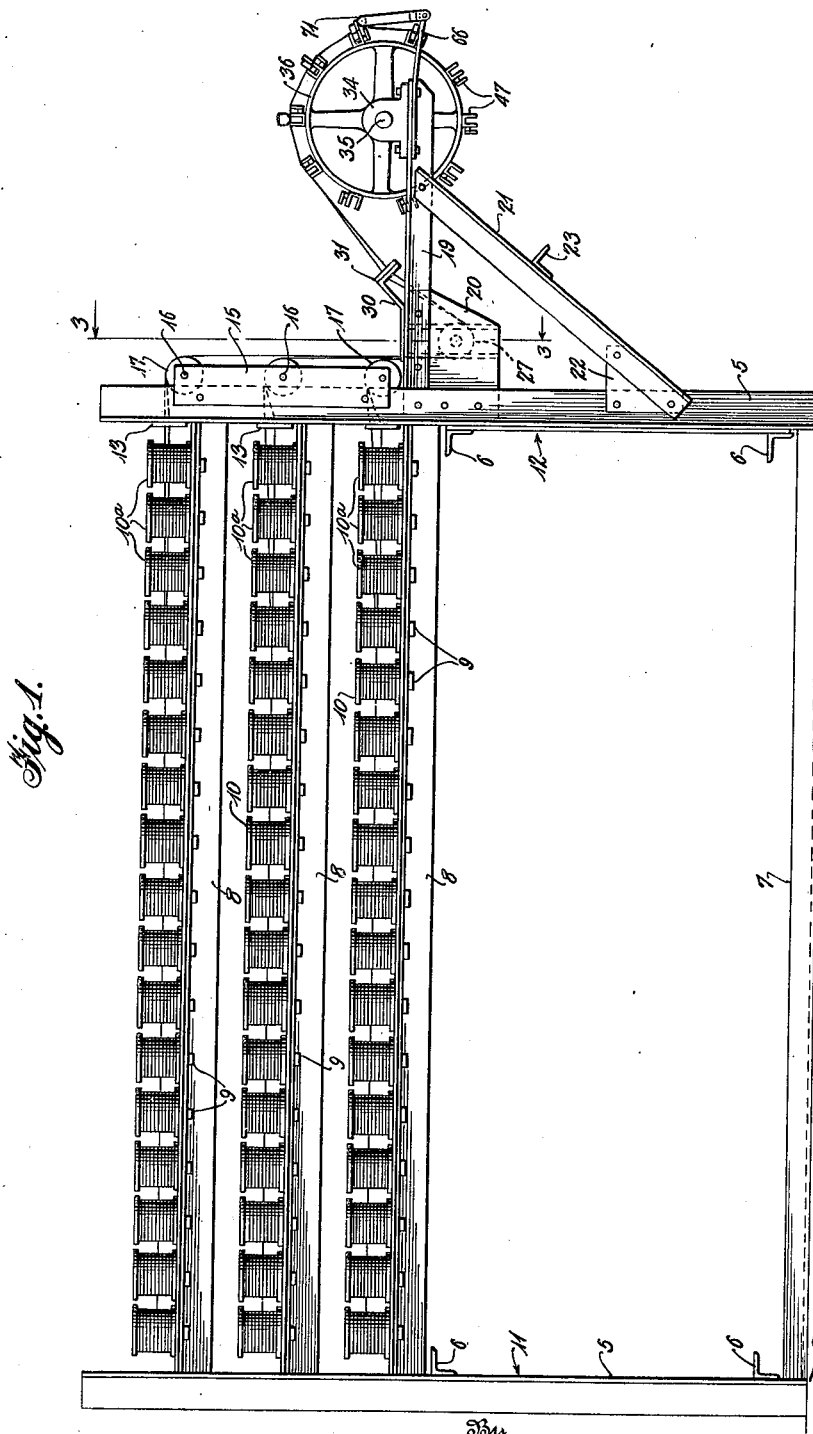

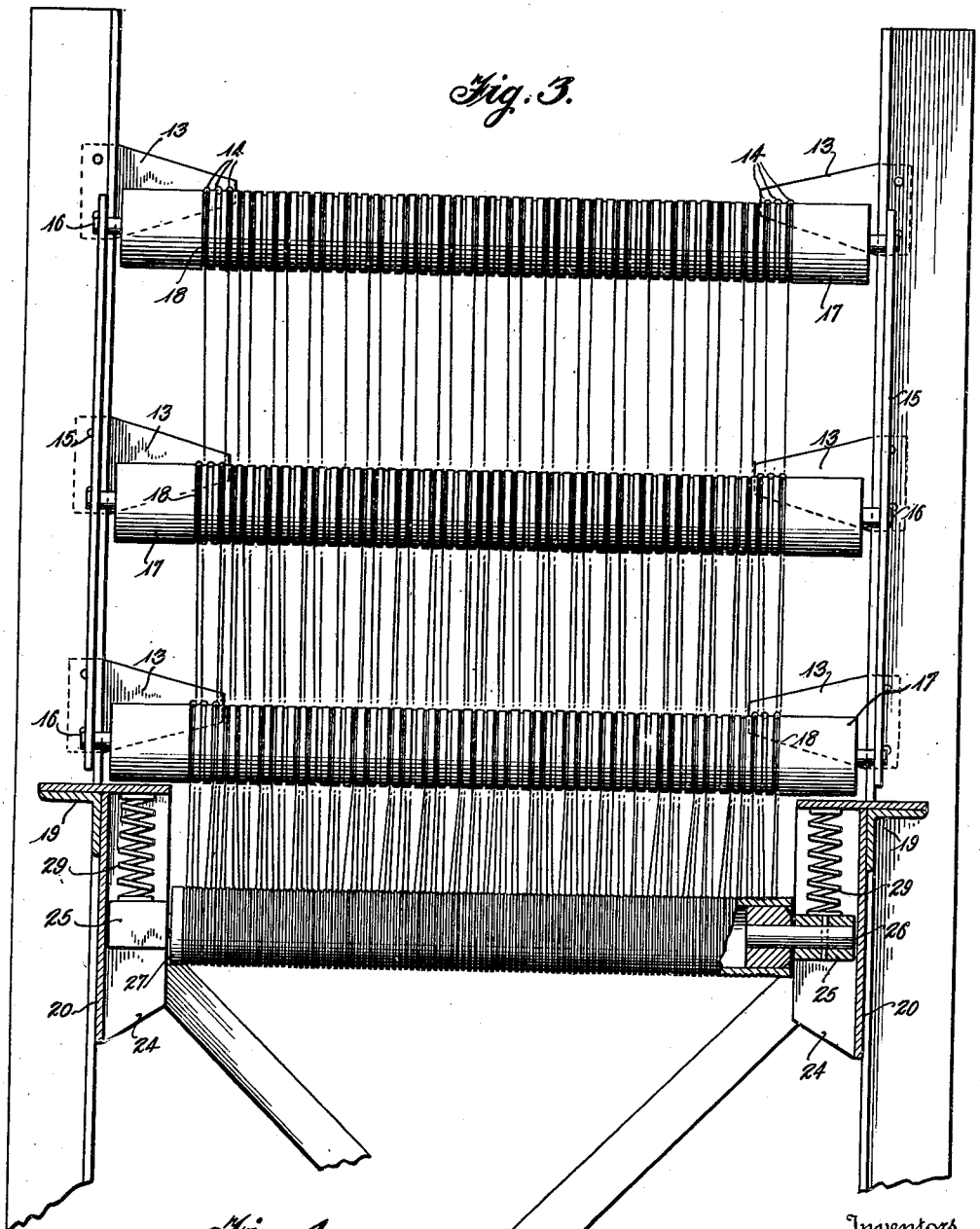

Oct. 28, 1941.   C. H. CAUGHEY ET AL   2,260,558
ELECTRICALLY IGNITED MATCH HEADS AND METHOD OF MANUFACTURING THE SAME
Filed May 16, 1939   14 Sheets-Sheet 4
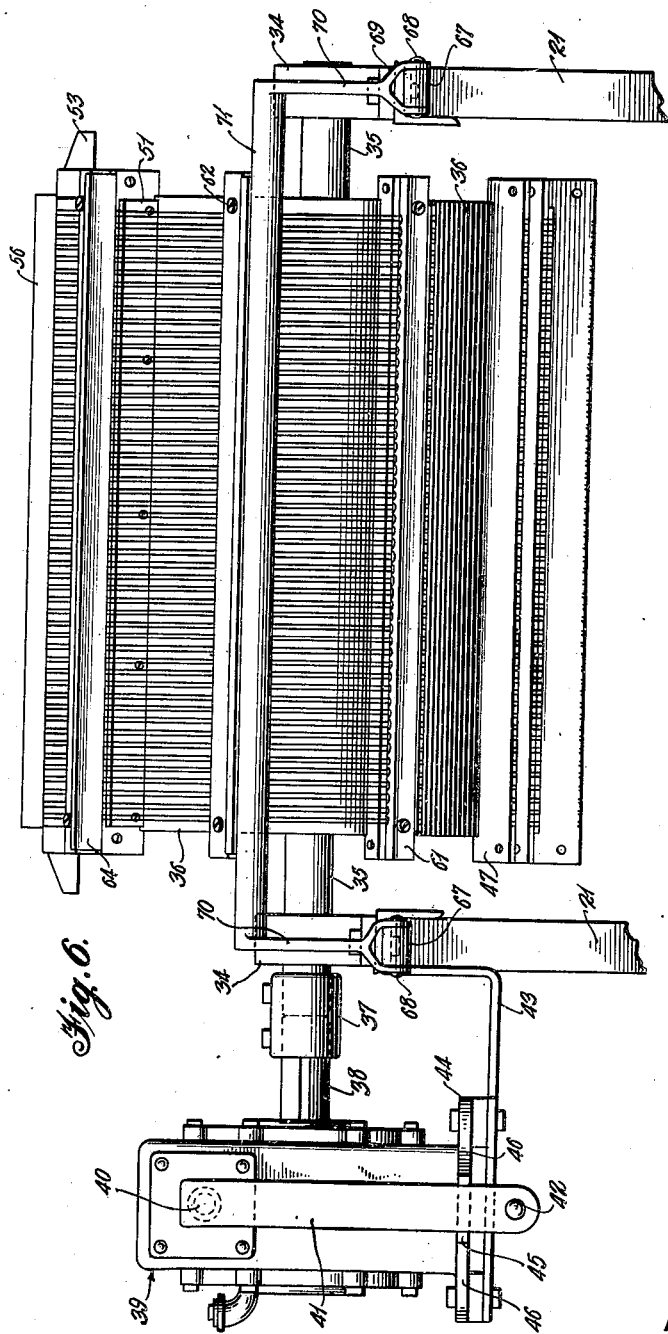
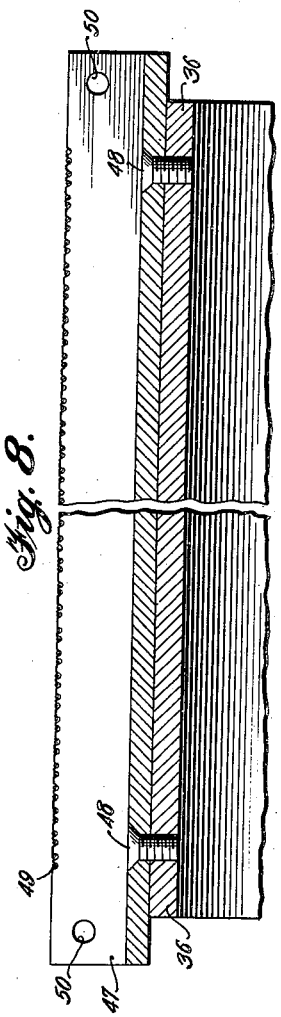
Inventors
Clarence H. Caughey and
Walter F. Mitcheltree
Attorney Oct. 28, 1941. C. H. CAUGHEY ET AL 2,260,558
ELECTRICALLY IGNITED MATCH HEADS AND METHOD OF MANUFACTURING THE SAME
Filed May 16, 1939 14 Sheets-Sheet 5
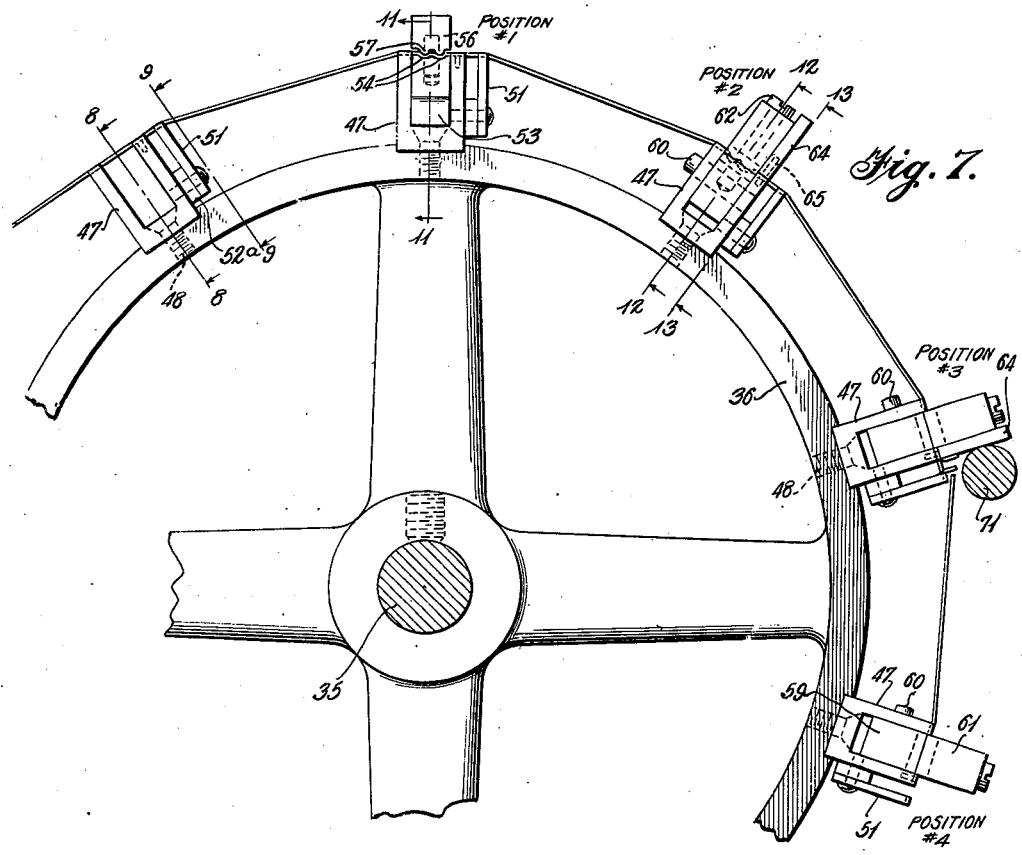
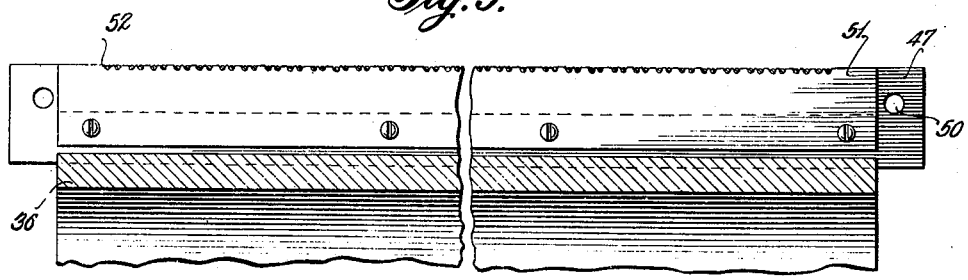
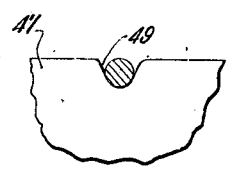
Inventors
Clarence H. Caughey and
Walter F. Mitcheltree

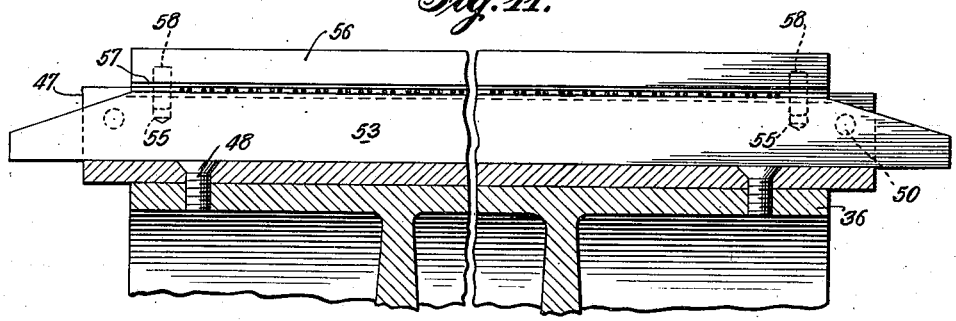
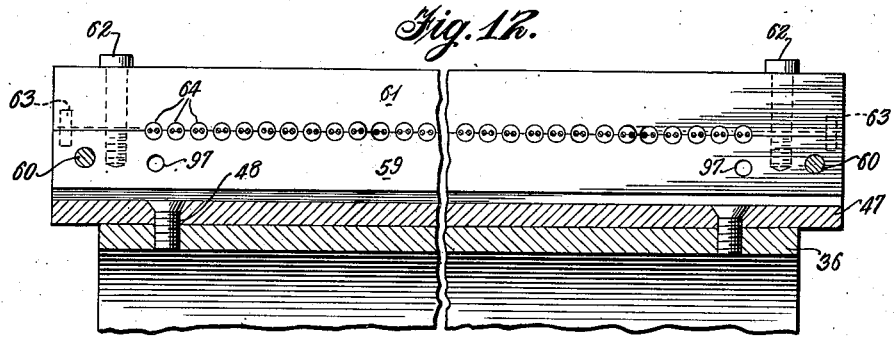
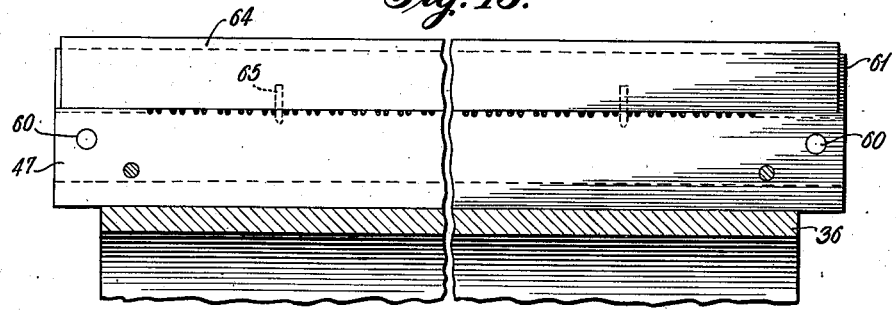

Oct. 28, 1941.   C. H. CAUGHEY ET AL   2,260,558
ELECTRICALLY IGNITED MATCH HEADS AND METHOD OF MANUFACTURING THE SAME
Filed May 16, 1939   14 Sheets-Sheet 7
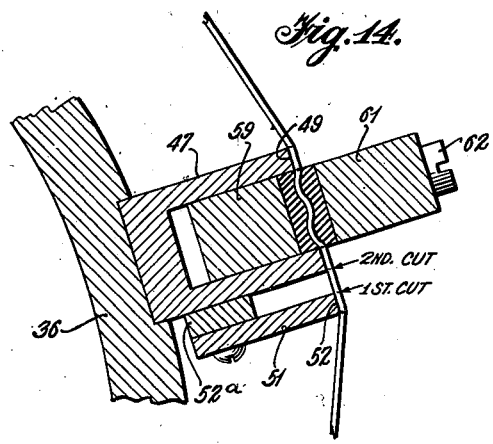
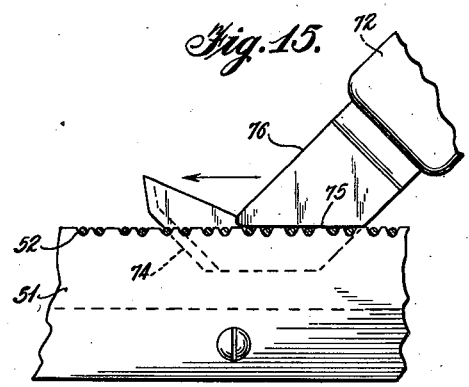
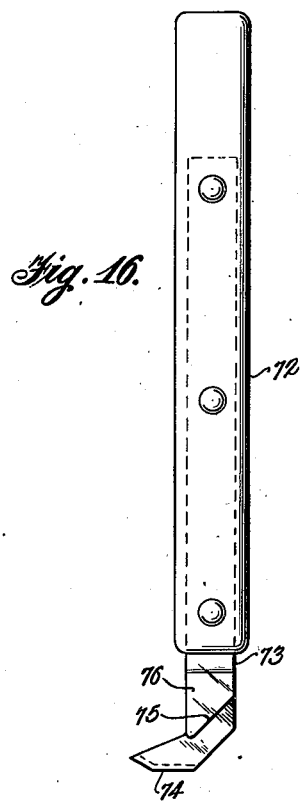
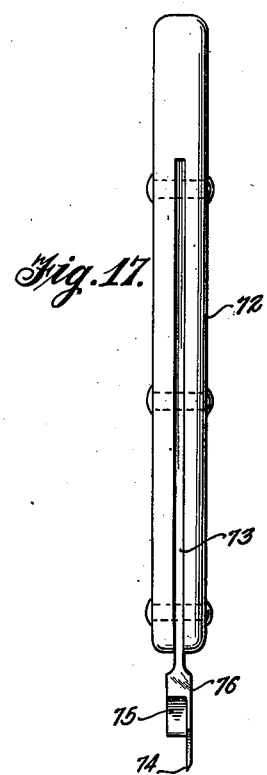
Inventors
Clarence H. Caughey and
Walter F. Mitcheltree
By L. Donald Myers
Attorney Oct. 28, 1941.  C. H. CAUGHEY ET AL  2,260,558
ELECTRICALLY IGNITED MATCH HEADS AND METHOD OF MANUFACTURING THE SAME
Filed May 16, 1939  14 Sheets-Sheet 8
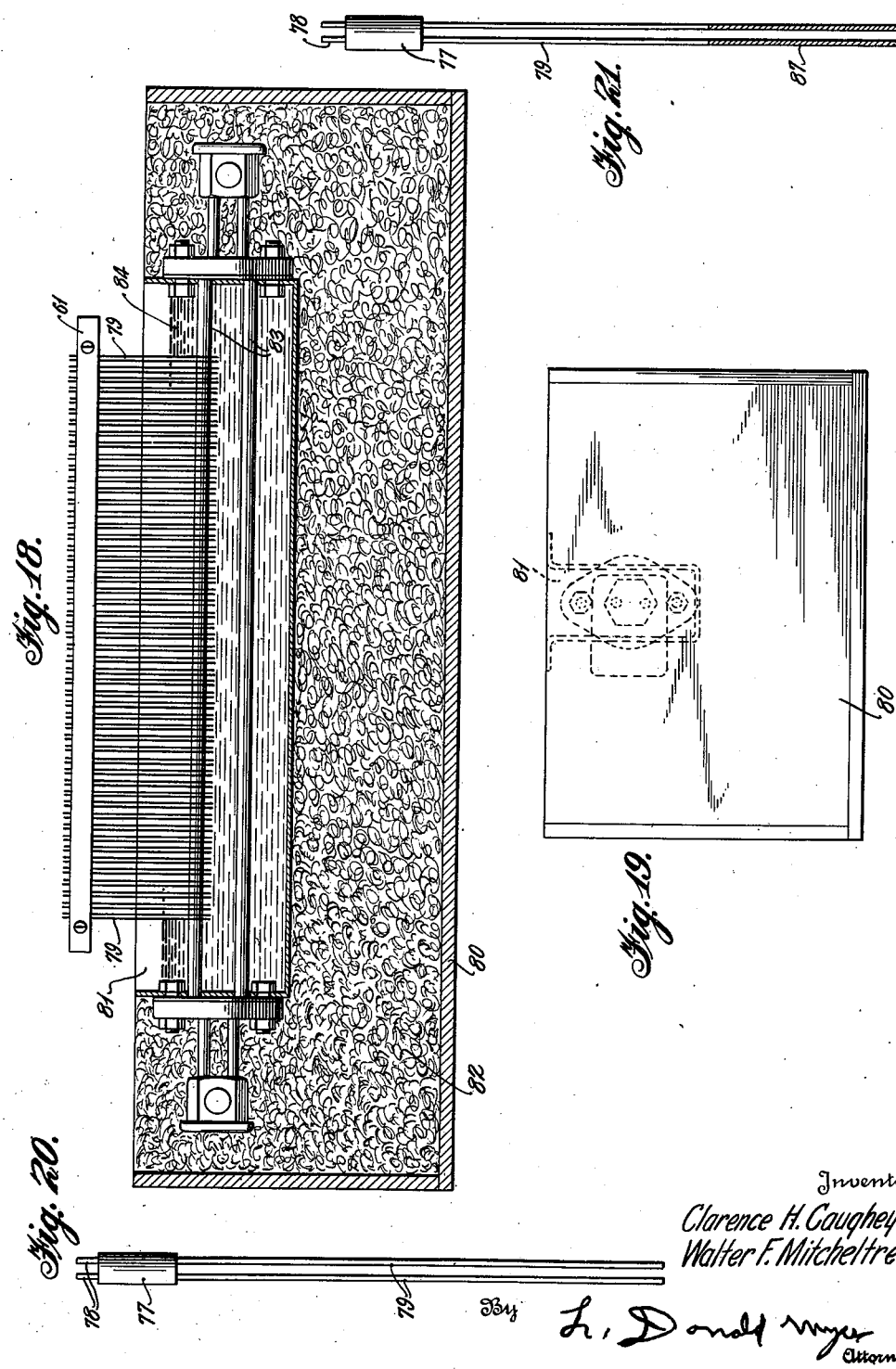
Inventors
Clarence H. Caughey and
Walter F. Mitcheltree
By L. Donald Myer
Attorney Oct. 28, 1941.    C. H. CAUGHEY ET AL    2,260,558
ELECTRICALLY IGNITED MATCH HEADS AND METHOD OF MANUFACTURING THE SAME
Filed May 16, 1939    14 Sheets-Sheet 9
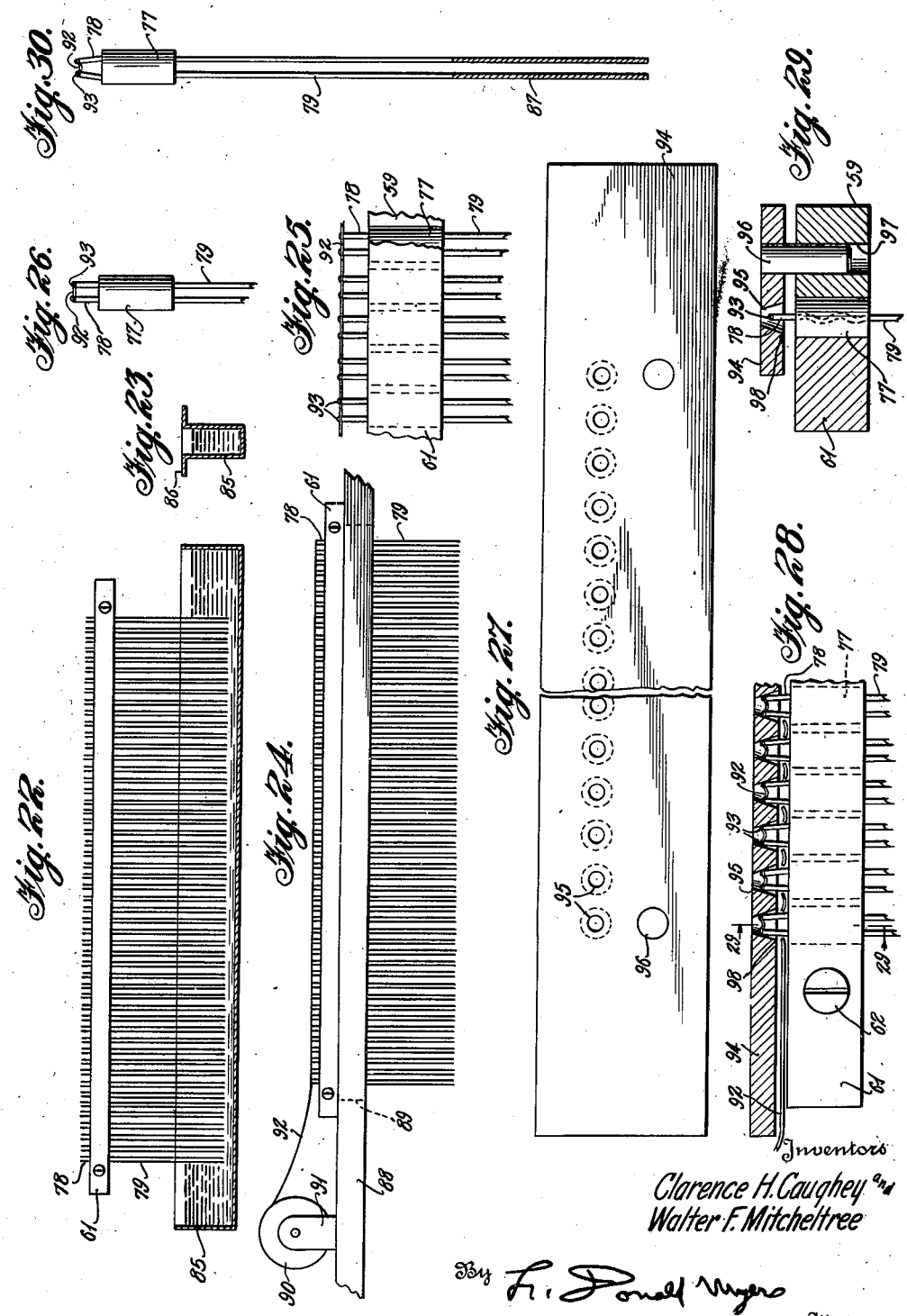
Inventors
Clarence H. Caughey and
Walter F. Mitcheltree
By L. Donald Myers
Attorney Oct. 28, 1941.   C. H. CAUGHEY ET AL   2,260,558
ELECTRICALLY IGNITED MATCH HEADS AND METHOD OF MANUFACTURING THE SAME
Filed May 16, 1939   14 Sheets-Sheet 10
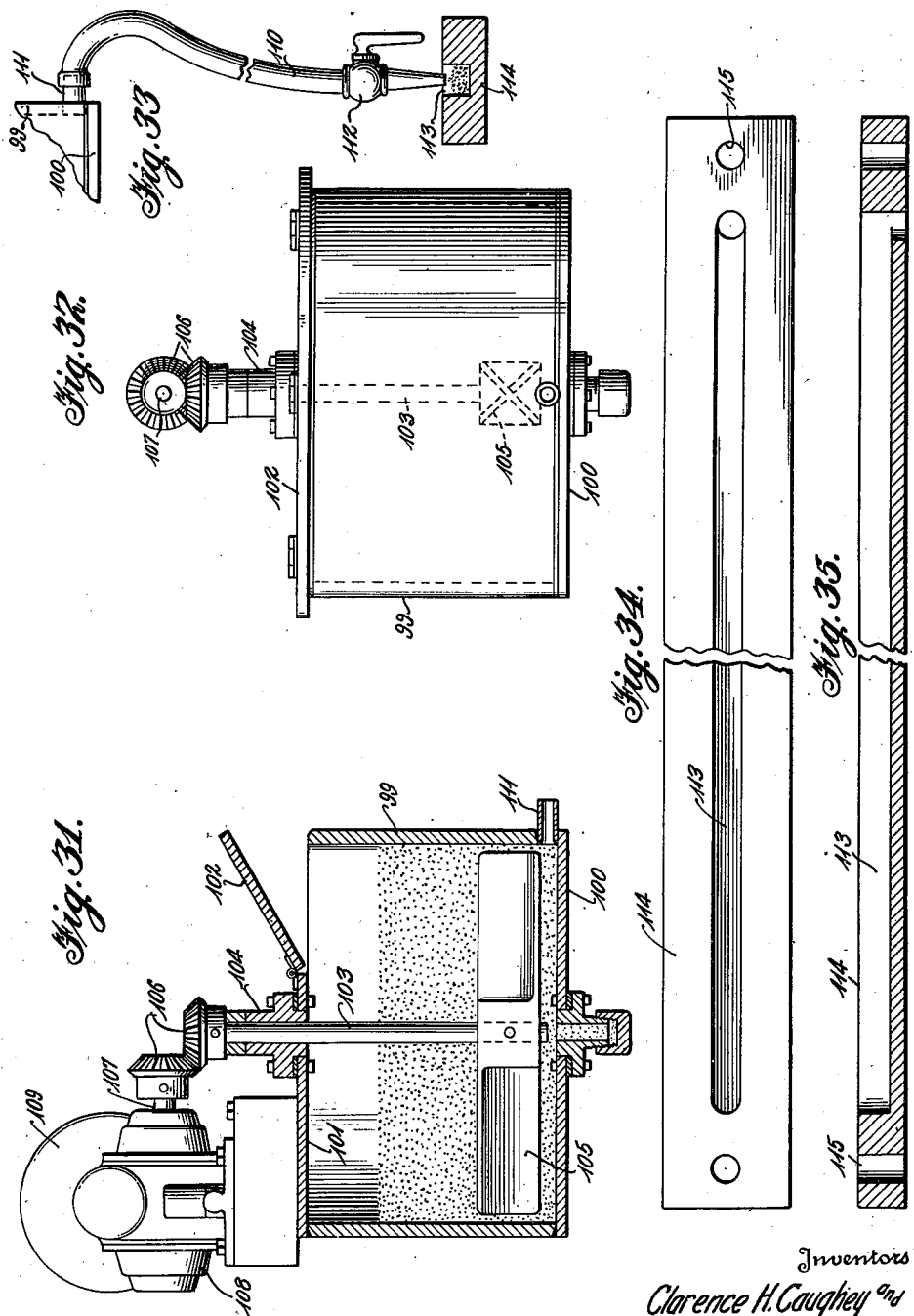
Inventors
Clarence H. Caughey and
Walter F. Mitcheltree
By L. Donald Myers
Attorney Oct. 28, 1941.  C. H. CAUGHEY ET AL  2,260,558
ELECTRICALLY IGNITED MATCH HEADS AND METHOD OF MANUFACTURING THE SAME
Filed May 16, 1939    14 Sheets-Sheet 11
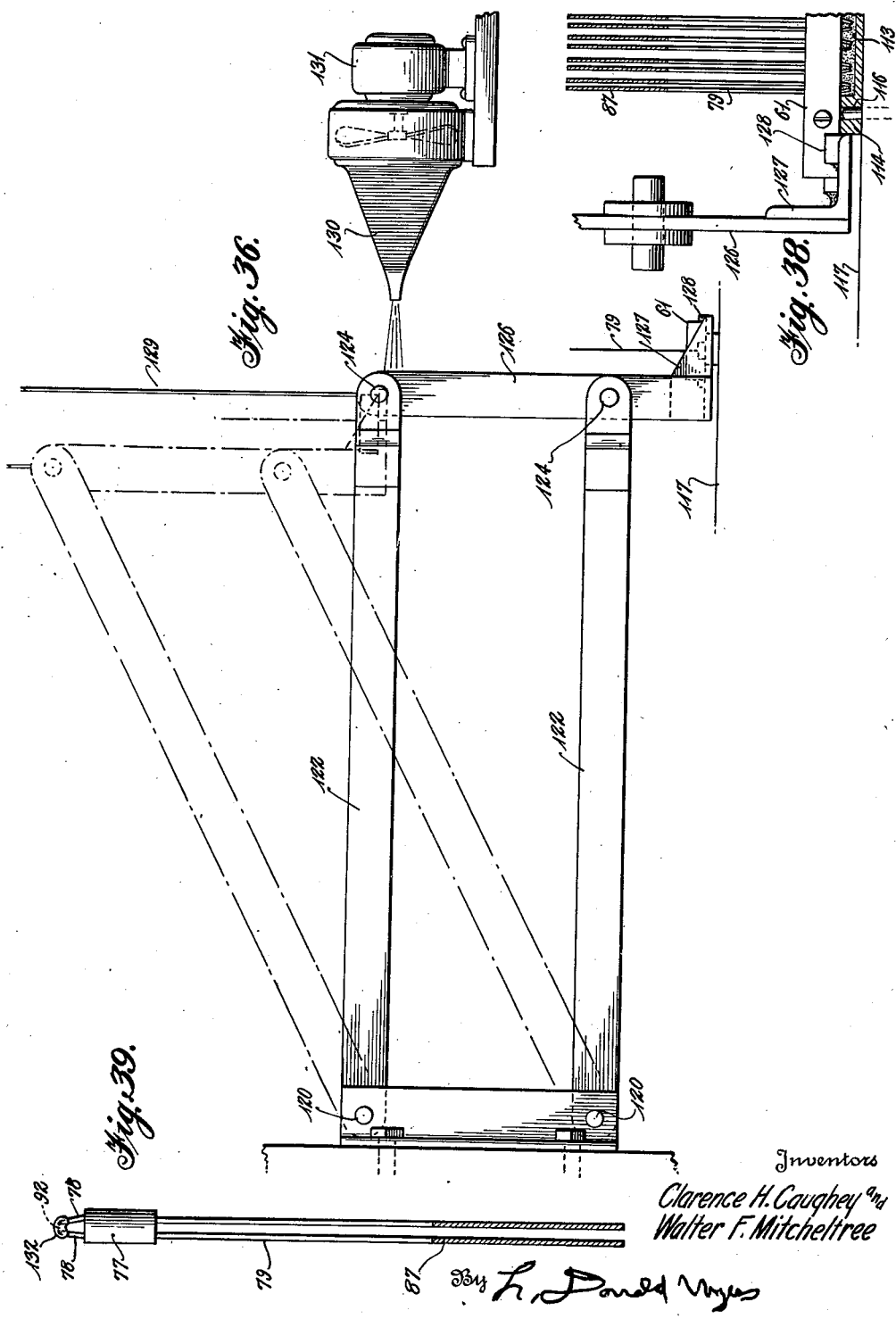
Inventors
Clarence H. Caughey and
Walter F. Mitcheltree
By L. Donald Noyes
Attorney Oct. 28, 1941.  C. H. CAUGHEY ET AL  2,260,558
ELECTRICALLY IGNITED MATCH HEADS AND METHOD OF MANUFACTURING THE SAME
Filed May 16, 1939  14 Sheets-Sheet 12
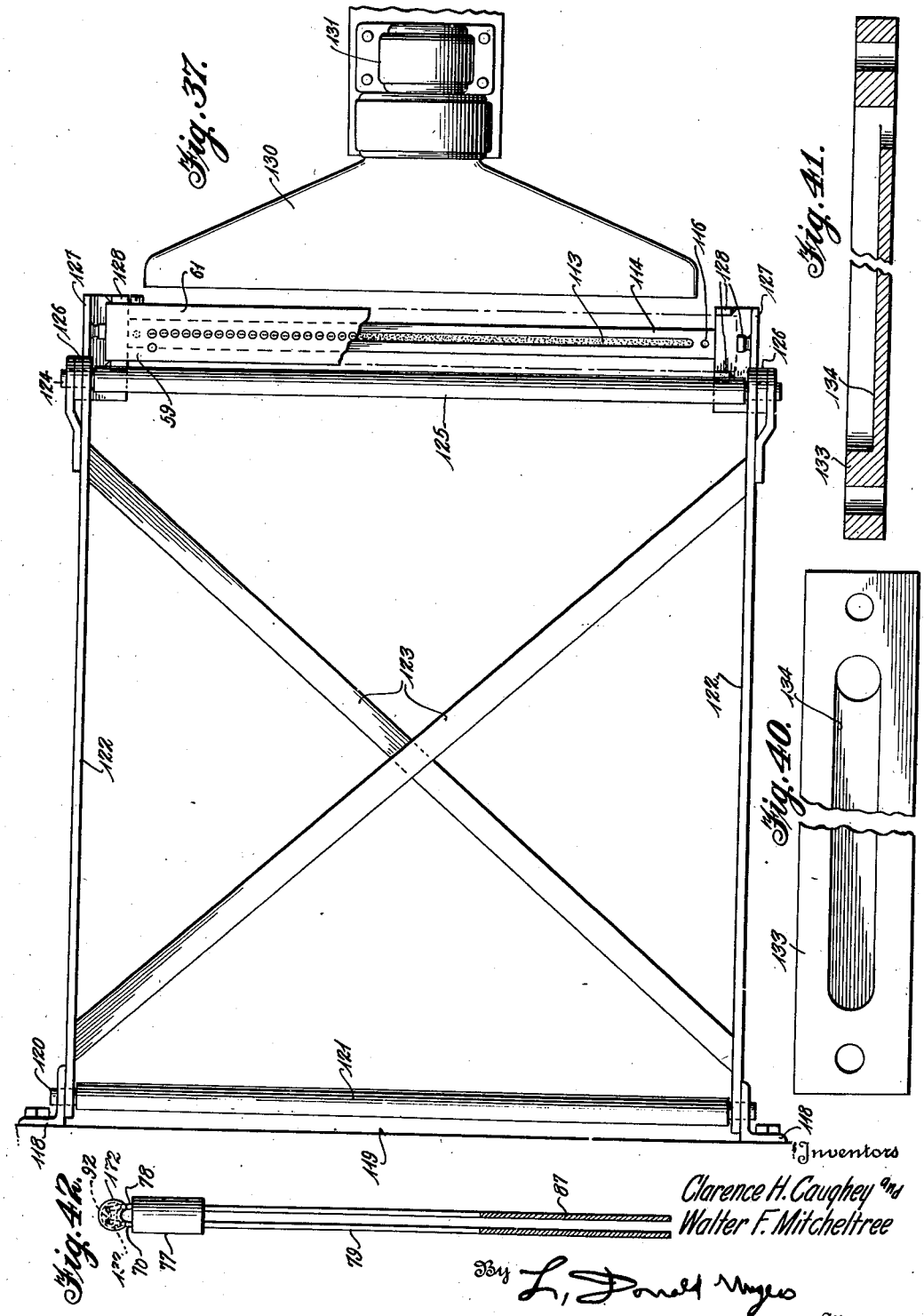
Inventors
Clarence H. Caughey and
Walter F. Mitcheltree
By L. Donald Myers
Attorney

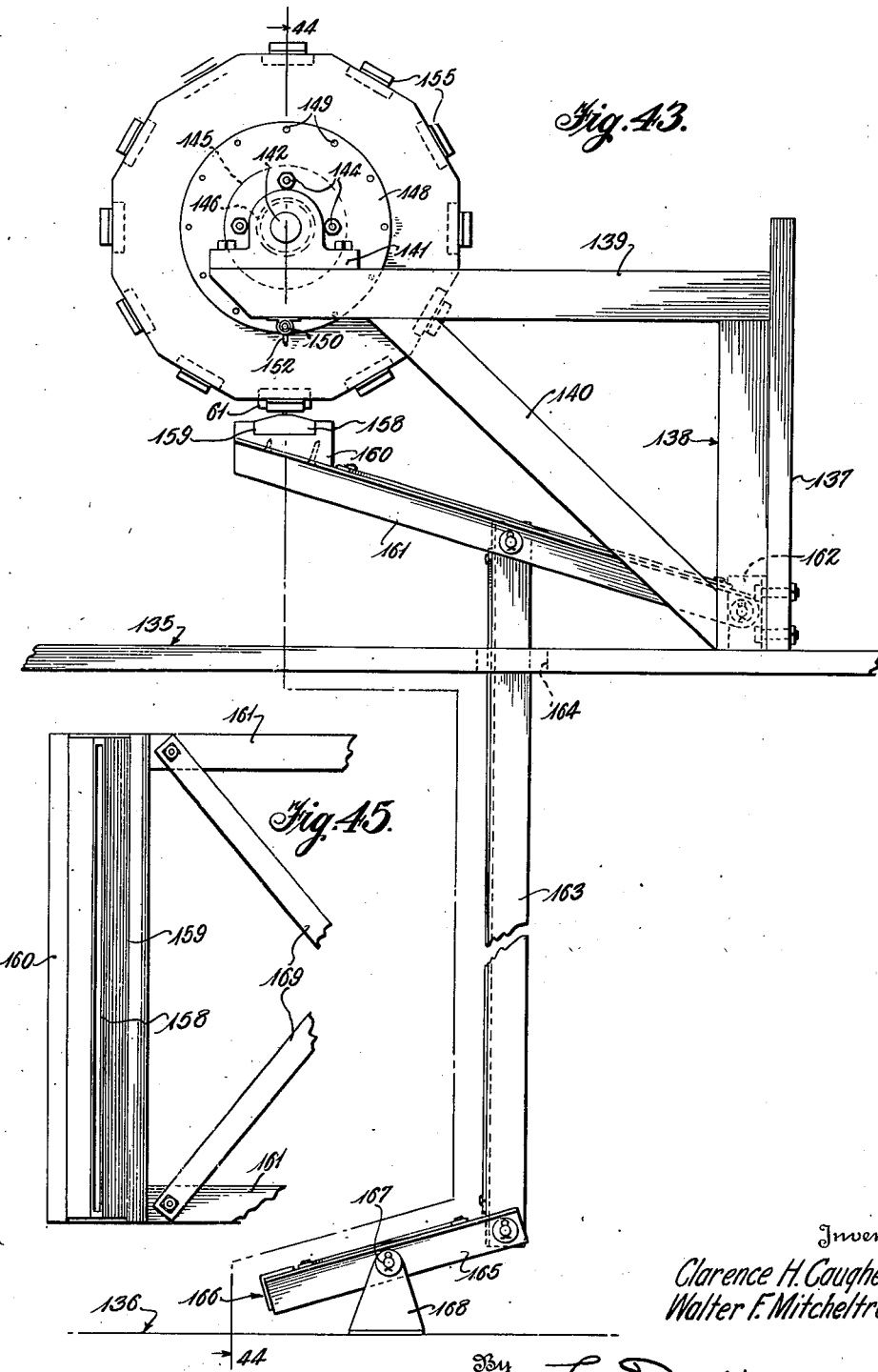

Oct. 28, 1941.  C. H. CAUGHEY ET AL  2,260,558
ELECTRICALLY IGNITED MATCH HEADS AND METHOD OF MANUFACTURING THE SAME
Filed May 16, 1939  14 Sheets—Sheet 14

Inventors
Clarence H. Caughey and
Walter F. Mitcheltree
By L. Donald Myers
Attorney Patented Oct. 28, 1941

2,260,558

UNITED STATES PATENT OFFICE 2,260,558

ELECTRICALLY IGNITED MATCH HEADS AND METHOD OF MANUFACTURING THE SAME

Clarence H. Caughey, Aurora, and Walter F. Mitcheltree, Benton, Ill., assignors to Cardox Corporation, Chicago, Ill., a corporation of Illinois Application May 16, 1939, Serial No. 274,072

16 Claims. (Cl. 86—1)

This invention relates to electrically ignited match heads and to a method of manufacturing the same in quantities.

Electrically ignited match heads of the type employed for firing detonators, powder blasting charges, the chemical heater units of gas developing liquid carbon dioxide and chemical blasting charges confined in re-usable cartridges, and the like, are of a rather delicate and fragile character which makes it extremely difficult to economically manufacture the same in quantities. Present practices entail several production steps during which the embryonic match heads are handled individually with the result that much time is lost in positioning and removing the said heads with respect to separate casting, shaping, soldering, and the like, devices.

It is the principal object of this invention to provide a method of producing electrically ignited match heads in which need for the separate handling of the match heads and the materials from which they are formed is entirely eliminated until the match heads exist as completed articles and are ready for the final inspection and tests.

More specifically, the invention embodies the manufacturing of match heads by a method the initial steps of which are carried out in a continuous manner so as to simultaneously advance the formation of comparatively large numbers of match heads in succeeding groups and the final steps of which are carried out by simultaneously manipulating and treating the numerous match heads of each group as a unit.

Other objects of the invention relate to the novel method steps of simultaneously assembling numerous pairs of wires in sealing plugs with the wires adequately anchored in their respective plugs; of simultaneously conditioning the igniter terminals of the pairs of wires and assembling therewith the igniter bridge wires or filaments; of simultaneously conditioning the lead ends of the pairs of wires to assure good electrical connections at the time of use of the match head; and of simultaneously embedding or enclosing each pair of igniter terminals and its bridge wire or filament in a body of a low flash point powder mixture which ignites upon fusing of the bridge wire and in a final covering or coating of a moisture proofing material.

A further object of the invention is to provide an improved form of electrically ignited match head.

Other objects and advantages of the invention will be apparent during the course of the following description.

In the accompanying drawings forming a part of this specification and in which like numerals are employed to designate like parts throughout the same:

Figure 1 is a side elevational view of a form of wire working apparatus by means of which a multiplicity of strands of wire are assembled in a continuous sequence of steps into a plurality of partially formed match heads;

Figure 2 is a top plan view of the wire working apparatus disclosed in Fig. 1;

Figure 3 is a fragmentary vertical sectional and elevational view taken on line 3—3 of Fig. 1;

Figure 4 is a detail, fragmentary elevational view of a type of guide roller employed in the mechanism best illustrated in Fig. 3;

Figure 5 is a detail elevational view of a form of guide plate employed in the apparatus disclosed in Figs. 1 to 3, inclusive;

Figure 6 is a fragmentary end elevational view of the wire working apparatus disclosed in the preceding figures;

Figure 7 is a fragmentary vertical sectional view of a wire working wheel or drum which forms a part of the apparatus disclosed best in Figs. 1, 2, and 6;

Figure 8 is a detail, transverse sectional view taken on line 8—8 of Fig. 7;

Figure 9 is a detail, transverse sectional view taken on line 9—9 of Fig. 7;

Figure 10 is a fragmentary elevational view illustrating the type of wire receiving notch formed in certain of the elements illustrated in Fig. 7;

Figure 11 is a detail transverse sectional view taken on line 11—11 of Fig. 7;

Figure 12 is a detail transverse sectional view taken on line 12—12 of Fig. 7;

Figure 13 is a detail transverse sectional view taken on line 13—13 of Fig. 7;

Figure 14 is a detail, fragmentary, vertical sectional view taken circumferentially of the wire forming wheel or drum disclosed in Fig. 7 and illustrates the point at which the numerous strands are cut to sever one group of partially formed match heads from the portions of the strands of wire which extend partially around the forming wheel or drum and back to their several sources of supply;

Figure 15 is a fragmentary, elevational view of the apparatus disclosed in Fig. 14 with a cutting tool in operation to sever the wire strands;

Figures 16 and 17 are elevational views of the wire cutting tool illustrated in operation in Fig. 15;

Figure 18 is a vertical sectional view of a tinning bath which is employed for simultaneously applying tinning material to a desired amount of the end portions of all of the lead wires for a group of match heads which are manipulated as a unit;

Figure 19 is an end elevational view of the tinning bath disclosed in Fig. 18;

Figure 20 is a detail elevational view of one of the match heads prior to tinnning the ends of the lead wires;

Figure 21 is a similar view of a match head illustrating the tinned lead wires;

Figure 22 is a longitudinal, vertical sectional view of a flux applying bath which is employed in connection with the tinning of the lead wires;

Figure 23 is a transverse sectional view of the flux bath disclosed in Fig. 22;

Figure 24 is an elevational view which illustrates the step of soldering a bridge wire or filament to all of the igniter terminals of a group of match heads;

Figure 25 is a fragmentary view of a portion of the group of match heads illustrated in Fig. 24 with the single strand of fusible wire soldered to the igniter terminals;

Figure 26 is a detail, fragmentary view of a single match head as it appears with the bridge wire soldered to its two igniter terminals;

Figure 27 is a bottom plan view of a bridge wire cut-off and igniter terminal pinching tool which provides the bridge wire or filament for each match head with a desired degree of slack to prevent breaking of the same due to any contraction that might occur;

Figure 28 is a fragmentary longitudinal sectional view illustrating the operation of the tool disclosed in Fig. 27;

Figure 29 is a transverse vertical sectional view taken on line 29—29 of Fig. 28;

Figure 30 is an elevational view of a match head and illustrates the condition of the same at this point in the method;

Figure 31 is a vertical sectional view of mixing and agitating mechanism employed for conditioning a low flash point powder mixture employed for coating the igniter terminals and the bridge wire of each match head;

Figure 32 is an elevational view of the apparatus disclosed in Fig. 31 and taken at right angles to this latter figure;

Figure 33 is a detail elevational view illustrating the manner of delivering the powder mixture to a suitable dipping trough;

Figure 34 is a top plan view of a form of dipping trough employed for applying the powder coating to the match head bridge wire and terminals;

Figure 35 is a vertical, longitudinal sectional view of the trough disclosed in Fig. 34;

Figure 36 is a side elevational view of apparatus employed for simultaneously dipping the terminals and bridge wires of a group of match heads in the powder mixture and for drying the dipped match heads after each one of several dipping operations;

Figure 37 is a top plan view of the dipping apparatus disclosed in Fig. 36;

Figure 38 is a detail, fragmentary enlarged view illustrating the step of dipping the terminals and bridge wires of several match heads in the powder mixture;

Figure 39 is a detail elevational view of a single match head with the powder mixture properly applied to the ends of the igniter terminals and the bridge wire;

Figure 40 is a top plan view of a trough which is employed for applying a moisture-proof covering or coating to the powder mixture which was previously applied to the bridge wire terminals and the bridge wire;

Figure 41 is a longitudinal vertical sectional view of the dipping trough disclosed in Fig. 40;

Figure 42 is a detail elevational view of a completed match head;

Figure 43 is a side elevational view of a modified form of apparatus from that disclosed in Figs. 36 to 38, for simultaneously dipping the terminals and bridge wires of a group of match heads in the powder mixture and for drying the dipped match heads;

Figure 45 is a fragmentary plan view of the powder holding trough portion of the apparatus shown in Figs. 43 and 44.

Figure 44:
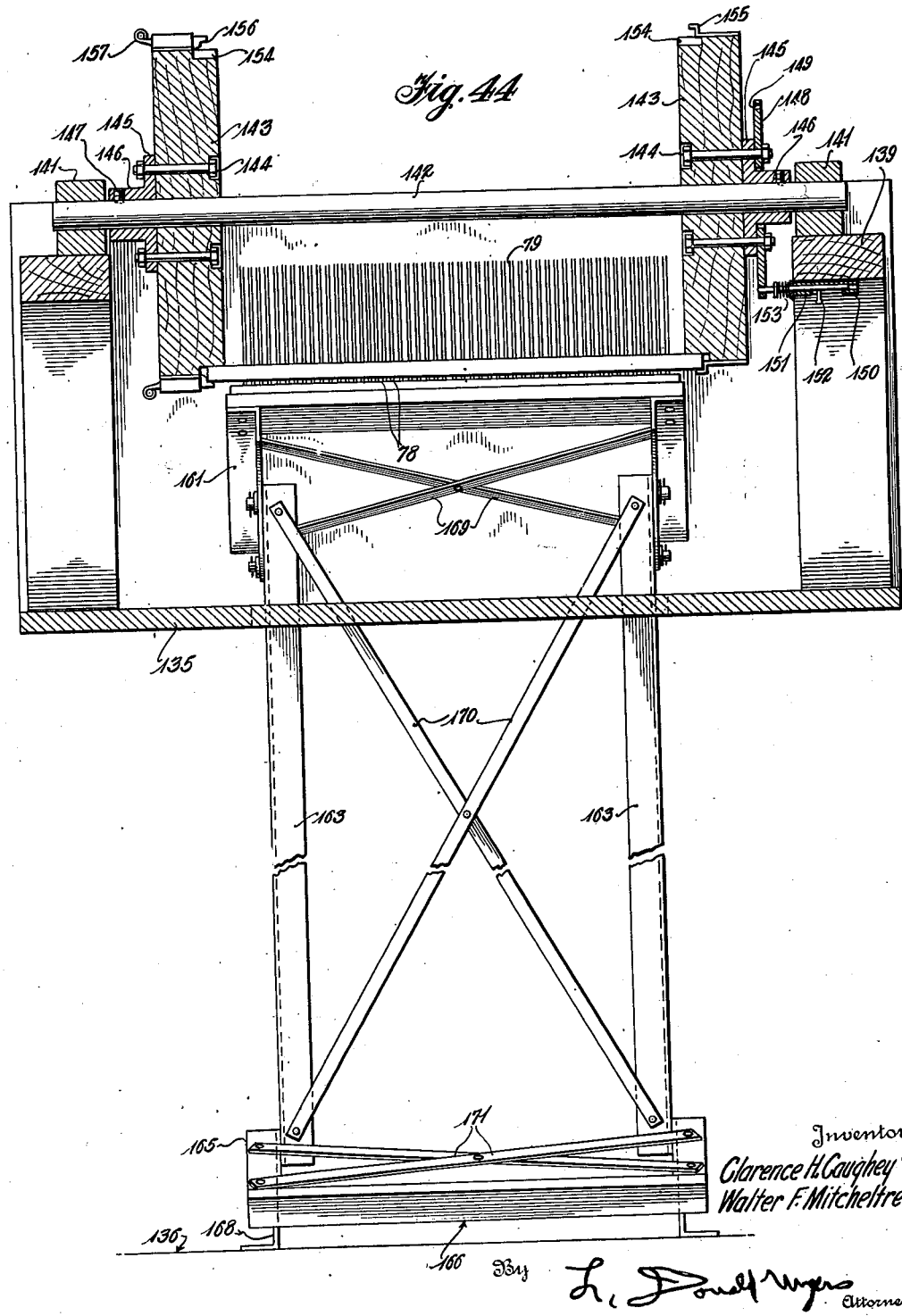
Figure 44 is a vertical sectional view taken on line 44—44 of Fig. 43.

In the drawings, wherein for the purpose of illustration are disclosed the various steps of the method practiced in accordance with this invention to produce match heads in quantities and the apparatus which is utilized to perform the method steps, and particularly referring to Figs. 1 and 2, the reference character 5 designates each one of four perpendicularly arranged, angle iron members which form a part of a frame intended for supporting a multiplicity of supply spools of wire. Fig. 2 clearly illustrates these frame members 5 as being arranged relative to each other so as to define a substantially triangular frame when viewed in top plan. Suitable transverse brace members 6 and longitudinal brace members 7 are employed for tying together the various perpendicular members 5 so as to retain them in their desired relative positions and to complete the lower portion of the frame.

Suitably secured at their ends to the upright angle irons 5 are the horizontally extending angle irons 8. In the present embodiment of this invention, there are three of these angle irons 8 arranged on each side of the substantially triangularly shaped frame, and these angle irons are arranged so that one flange of each of the same provides a horizontal shelf or support for receiving the spool mounting pins 9. All of these pins extend vertically, and each one of the same is intended to have rotatably mounted thereon a spool 10 of wire. The particular wire best adapted for forming the match heads of this invention has been found to be No. 19 gauge soft copper enameled wire. This particular wire working apparatus is designed to produce succeeding groups of match heads with fifty-one match heads to a group. As each match head involves two sections of wire, there are supported on the angle iron members 102 supply spools 10. There are, therefore, seventeen spools carried by each one of the members 8. These 102 spools are arranged in three horizontal banks with thirty-four supply spools to a bank.

Fig. 2 clearly illustrates the fact that with the wires leaving the inner side of the various supply spools 10 and with the supporting frame members 8 converging toward the rear end 11 of the frame, the wire strands from all of the spools, with the exception of the six inner end spools 10a of each bank, may be extended in parallelism with each other and out of contact toward the front end 12 of the frame. Due to the positioning of the six spools 10a of each bank, guiding means must be employed for delivering the wire strands from these spools into parallelism with the remaining strands. This guiding means takes the form of a plate 13 for each frame member 8 of the several banks. These guiding plates 13 are each provided with three porcelain eyelets 14 through which pass the wire strands from the adjacent three supply spools 10a.

Referring now particularly to Figs. 1 and 3, it will be seen that the perpendicular angle iron frame members 5, located at the front end 12 of the wire supporting frame, are each provided with a vertically extending plate 15. These parallel plates 15 function as mounts for the shafts 16 of the three parallel guiding rolls 17. Each one of these guiding rolls 17 is provided with thirty-four continuous, peripheral grooves 18 which receive the strands of wire from the supply spools 10 and 10a. It will be noted that there is provided one of these guiding rolls 17 for each bank of supply spools. The various wire strands pass over the top of the guiding rolls 17 and then travel downwardly at the front end of the wire supply frame. This travel of the 102 wire strands is best illustrated in Figs. 1 and 3.

Referring now particularly to Figs. 1 and 2, there is disclosed a bracket structure which projects from the front end 12 of the wire frame. This bracket structure includes two horizontally extending, parallel angle iron arms 19 which are rigidly secured to the perpendicular frame members 5 at their inner ends by fish plates 20. Extending diagonally upwardly from the lower portion of each one of the front frame members 5 is a bracket arm 21 which is secured to the frame member 5 by a plate 22 and is properly secured at its upper end to the outer end portion of the bracket arm 19 on its particular side of the bracket. A cross brace 23 interconnects the diagonal braces 21.

Figs. 1 and 3 disclose the fish plates 20 as being provided with vertically extending guiding channels 24 in which are vertically, slidably mounted the bearings 25 for the shafts 26 of an additional guiding roll 27. This guiding roll is provided with 102 continuous, peripheral grooves 28 which are illustrated in detail in Fig. 4 as being arranged in fifty-one pairs. In other words, the two wires for each pair of grooves are intended eventually to be formed into a longitudinally succeeding series of match heads with two wire strands forming a part of each match head. The wire strands coming from the guide rolls 17 and extending downwardly at the front end 12 of the wire frame pass around the under side of the guiding roll 27. Fig. 3 discloses a spring 29 for each end of the guide roll 27. These springs 29 are intended to bias the guide roll 27 downwardly to apply tension to the 102 wire strands. The structural characteristics of these springs 29 and the mounting elements for the same are not completely illustrated, and it is to be understood that any desired form of spring structure or assembly may be employed just so the springs function to urge the guiding roller 27 downwardly to properly tension the wire strands.

Figs. 1 and 2 illustrate angle arms 30 carried by the bracket arms 19 and having their free end portions arranged to support at a proper angle the guide plate 31 which is provided, as is best illustrated in Figs. 2 and 5, with 102 eyelets 32. The 102 wire strands passing from beneath the guiding roll 27 are led upwardly through these eyelets 32 of the guiding plate 31. It will be appreciated that the opposite ends of this guiding plate are secured to the angle brackets or arms 30 by means of the bolts, or the like, 33, as is best illustrated in Fig. 2.

Mounted on the outer extremities of the bracket arms 19 are the aligned shaft bearings 34, see Figs. 1, 2, and 6. Journaled in these bearings is a transversely extending shaft 35 which has suitably keyed thereto a wheel or drum 36. The periphery of this wheel or drum is substantially solid or continuous both circumferentially and axially and takes the general form of a cylinder.

In Figs. 2 and 6, one end of the wheel or drum supporting shaft 35 is illustrated as extending beyond its bearing 34 for being connected by the coupling 37 to the shaft 38 of the speed reducing gear unit 39. The details of this gear unit are not illustrated, but it is to be understood that a worm wheel is suitably keyed to the shaft 38 and has meshing with its periphery a worm pinion carried by the shaft 40. The worm wheel and worm pinion are so constructed as to provide a speed reduction ratio of twenty to one. The shaft 40 of the worm pinion has secured thereto the arm 41 which is provided with a handle 42 at its free end. This reduction gear unit is mounted on a bracket plate 43 which is suitably secured to the adjacent bracket arm 19. A locking plate 44 is carried by this bracket and is provided with a notch 45 intended to receive the crank arm 41 when the latter extends downwardly in the position illustrated in Figs. 2 and 6. The edges 46 of this locking plate have a camming action on the crank arm 41. This crank arm is sufficiently flexible so that it may be sprung or bent in passing along an edge 46 of the locking plate 44 into register with the notch 45.

Due to the great reduction of this gear unit, the wire forming wheel or drum 36 may be turned by hand notwithstanding the load imposed thereon by the 102 strands of wire which, as will be explained at a later point, are trained over the periphery of this wheel or drum. It is the purpose of this reduction gear unit to permit the wire forming wheel or drum 36 to be rotated exactly one-tenth of a complete revolution or 36° every time the wheel or drum is advanced. Due to the ratio of the reduction gear unit, the crank arm 41 is intended to be rotated two complete revolutions; i. e., after the crank arm 41 leaves the locking notch 45, it will make two complete revolutions and will be passed over the locking notch 45 for the first revolution. The crank arm will be left in the notch 45 after the second revolution.

By an inspection of Fig. 1, it will be seen that the forming wheel or drum 36 has mounted on its periphery at ten equally spaced points the holders 47. These holders are of substantially U shape in transverse section and are arranged to extend axially of the periphery of the wheel or drum. The holders are of slightly greater length than the axial length of the wheel or drum so as to project beyond the side edges of the latter. Screws or the like 48 are employed for rigidly securing the holders in grooves in the peripheral surface of the wheel or drum. Each side of each holder has its upper or outer edge formed with fifty-one pairs of wire receiving notches 49. The arrangement of these notches is clearly illustrated in Fig. 8. These notches are of a proper depth to entirely receive the wire strands, i. e., the depth of each notch 49 is equal to the diameter of the wire strand which lies within the same. Each projecting end portion of each side of every holder 47 is provided with an aperture 50, see Fig. 8.

Figs. 7 and 9 illustrate the leading or forward side of each holder 47 as having secured thereto a longitudinally extending cut-off bar 51. These bars are maintained in spaced parallelism with the adjacent side of their frames by means of spacer strips 52a. The upper longitudinal edge of each cut-off bar is provided with fifty-one pairs of wire receiving notches 52a which are arranged in circumferential alignment with the notches 49 of the holders 47.

Fig. 7 illustrates four of the holders 47 as having associated therewith certain wire treating implements or instrumentalities. These four holders are further identified by the legends position No. 1, position No. 2, position No. 3, and position No. 4. Different match head forming steps will be described in connection with these four positions.

Reference is made to Fig. 11, in addition to Fig. 7, in connection with the step which is performed at position No. 1. At this position, a female die member 53 is passed endwise into the recess of the holder 47. This die member 53 has its upper longitudinal edge formed with two parallel, longitudinally extending grooves 54. This upper edge is of sufficient length to project beyond both sides of the band or ribbon of wire strands received in the notches 49 and 52 of the holder 47 and cut-off bar 51. The female die member 53 has a socket 55 formed in each end portion beyond the outside wire strand on each edge of the ribbon or band. A male die member 56 is provided to cooperate with the female die member 53 and is provided with two longitudinally extending ribs 57 which will register with the female grooves 54. The male die member 56 is provided with dowel pins 58 to be received in the sockets 55 of the female die member so as to properly register both of said members. When the male and female die members are properly positioned with respect to each other and the wires passing over the upper edges of the holder 47 in position No. 1, the upper face or edge of the male die member 56 is struck several blows, which are distributed along its length, with a suitable mallet, or the like. These blows cause the ribs 57 to drive the wire strands down into the female grooves 54 for simultaneously placing two kinks in each strand of wire. After the wire strands are kinked in this manner, the male and female die members are disassembled with respect to the holder 47 arranged in position No. 1.

Figs. 12 and 13 should be considered in connection with the description of what takes place in position No. 2. Figs. 7 and 12 disclose a mold member 59 which is inserted longitudinally into the cavity of the holder 47 located at position No. 2, and this mold member is securely fastened to the holder by means of taper pins 60, which are driven into the apertures 50 formed in the opposite sides of the holder 47 and in suitable apertures formed in this inner mold part 59. An outer mold part 61 is positioned over the inner mold part, and outside of the strands of wire, and is secured to the inner mold part by means of screws 62. Dowel pins 63 may be employed for assisting in registering these inner and outer mold parts 59 and 61. The screws 62 securely fasten the two mold parts together, and the pins 60 securely fasten the inner mold part 59 to the holder 47. Fig. 12 clearly illustrates the two mold parts as having formed in their adjacent edges or faces the respective halves of fifty-one cylindrical mold cavities 64. These mold cavities register with the fifty-one pairs of wire strands. The mold cavities are of uniform diameter throughout their length and are entirely open at both ends. The inner half of each one of these mold cavities is closed at both of its ends by means of the sides of the holder 47. For the purpose of closing the upper half of the several mold cavities 64 at their leading or forward ends, a back-up or closure plate 64 is mounted longitudinally of and edge-to-edge with the forward side of the holder 47. Dowel pins 65 may be employed for maintaining this back-up or closure plate 64 in register with the side of the holder 47. Fig. 13 very clearly shows that the adjacent ends of all of the cavities 64 are completely closed with the exception of the notches through which the wires extend.

Figs. 1, 6 and 7 will be referred to in connection with position No. 3. In this position the holder 47, its two mold parts 59 and 61, and the back-up or closure plate 64 are approaching a horizontal position. Supplemental means must be provided, therefore, for holding in place the closure or back-up plate 64. Fig. 1 discloses a spring leaf 66 as projecting longitudinally of and beyond the end of each bracket arm 19. Fig. 6 discloses each one of these spring leaves 66 as terminating in an eye 67 through which passes a pin 68. The bifurcated or forked end 69 of an arm 70 is pivotally connected to the end 67 of each spring leaf by means of the associated pin 68. The arms 70 have suitably connected to their outer ends a rod or bar 71 which extends transversely of the apparatus or axially of the wire forming drum or wheel 36. Figs. 1 and 7 disclose the rod or bar 71 as being arranged in contact with the back-up or closure plate 64. Fig. 1 clearly illustrates the spring leaf 66 as being placed under tension or as being flexed downwardly by the positioning of the transverse bar or rod 71 in engagement with the back-up or closure plate 64. The tension imposed on these spring leaves 66, therefore, results in securely clamping the plates 64 to the side faces of the outer mold parts or members 61. The transverse bar or rod 71 may be moved out of this position by merely swinging the same outwardly and downwardly around the pivot pins 68 as a pivotal axis.

In this position No. 3, the mold cavities 64 are completely conditioned for receiving plastic material which will form on each pair of wires a sealing plug. The plastic plug material is readily poured into the upper open ends of the mold cavities by any suitable pouring ladle, or the like. As the material of these sealing plugs sets or hardens, the wires will be securely anchored to the plugs by the kinks which were placed in the wires at position No. 1.

The composition of this sealing plug material is 90% flowers of sulphur, 7% powdered mica (about 60 mesh), and 3% powdered charcoal. This mixture is heated and maintained at a temperature of from 130° to 140° C. It is very important that the temperature of this sulphur mix be held somewhere between 130° and 140° C. and an electrically heated oil bath, not shown, has been found to be the most satisfactory means for maintaining the mix at this temperature. At temperatures either above or below these values, the sulphur mix will not be suitable for pouring but when maintained within this temperature range the mix is quite liquid, pours easily, and hardens quickly. After pouring the fifty-one plugs, any excess sulphur left on the upper faces of the holder 47 and outer mold member should be scraped off with any suitable implement aided by tapping the outer mold member with a mallet. After the plugs have properly hardened, the transverse rod or bar 71 is moved out of position and the said closure or back-up plate 64 is removed.

During the next advancement of the wire forming wheel or drum 36, the holder 47 arranged in position No. 3 will be advanced to position No. 4. Fig. 7 discloses in position No. 4 the mold members 59 and 61 with the set or group of sealing plugs and match head wires which were previously assembled in position No. 3 prior to the last advancement of the said wheel or drum. With a group or series of match head wires and plugs arranged in position No. 4, the wires should be severed at position No. 3. This severing of the wires may be best described in connection with Fig. 7 and Figs. 14 to 17, inclusive.

This cutting operation is very important in that great care must be taken to assure a good clean straight cut to form the end faces of the igniter terminals so that the bridge wire or filament may be properly secured thereto. It, also, is important that care be taken to prevent the lead ends of the wires from being moved into engagement with each other; i. e., moved out of true parallelism with each other, because if these lead wires are placed in engagement with each other they will be stuck together during a subsequent tinning operation. The wires are to be cut at two points, and these two cuts are clearly indicated in Fig. 14. The first cut occurs at the inner face of the cut-off bar 51. The second cut occurs at the outer face of the advance or leading side of the holder 47. The first cut leaves the extremities of the lead wires in the notches 52 of the cut-off plate while the second cut leaves the igniter terminals or short ends of the wires in the notches 49 of the leading or forward side of the holder 47.

Figs. 15 to 17, inclusive, disclose in detail a cutting tool which has been found to be entirely satisfactory. This tool includes a suitable handle 72 which has mounted therein the shank 73 of the cutter blade. This blade is provided with an angular cutting edge 74. The main portion of this edge is arranged at right angles to the longitudinal axis of the handle 72. A shoulder 75 is formed by a thickened portion 76 of the blade. The shoulder 75 is arranged approximately at an angle of 45° with respect to the main portion of the cutting edge 74. This cutting edge is formed by beveling the blade in one direction only so that the edge coincides with the flat side of the blade from which the shoulder 75 projects. Fig. 15 discloses the position of the cutting implement while severing the wires. The axis of the handle 72 is intended to be arranged at an angle of approximately 45° with respect to the top edge of the cut-off bar 51 for the first cut. This arrangement of the handle will permit the shoulder 75 to flatly engage the outer edge of the cut-off bar and, as the blade traverses the length of the bar, this shoulder 75 functions to hold the severed wire ends in the notches 52. The main portion of the cut-off edge of the blade is arranged at approximately a 45° angle with respect to the plane of the outer edge of the cut-off bar or plate 51. The cutting tool is intended to be advanced in the direction of the arrow shown in Fig. 15. After the cutting tool is advanced the length of the cut-off bar 51 from right to left, the tool is rotated 180° about its own axis so as to place the shoulder 75 in engagement with the outer edge of the leading or forward side of the holder 47. The cutting tool then may be advanced in the opposite direction along the edge of the holder side or in a direction extending from left to right.

This cutting of the wires leaves the group or series of embryonic match heads secured at position No. 4 entirely disconnected from the wire strands extending through positions numbered 1 to 3, inclusive. This group or series of match heads held at position No. 4 now have been finished insofar as the work performed on the wire forming wheel or drum 36 is concerned. This group or series of partially formed match heads should be removed from the wheel or drum. This is accomplished by driving out the two pins 60. The mold members 59 and 61 are left in place and now form a holder for the group or series of partially formed match heads. This group or series of match heads proceeds as a unit through the remaining steps of the method.

Before entirely leaving this wire forming wheel or drum, it is believed to be advisable to describe what has been found to be the most satisfactory procedure to follow in performing the operations at positions numbered 1 to 4, inclusive. It will be understood that work is performed at each one of positions numbered 1 to 3, inclusive, for each advancement of the wheel or drum 36.

At position No. 1, the kinking die members 53 and 56 are assembled and manipulated to provide the desired kinks in all of the wires. These die members are left in place until the holder bearing the same is advanced to the No. 2 position. The die members then are disassembled and reassembled in the holder 47 which has been moved into the No. 1 position. After the die members have been removed from the holder 47 in No. 2 position, the mold members 59 and 61 are assembled with respect to the holder in the No. 2 position. The mold cavity closure or back-up plate 64 also is assembled at the No. 2 position. When the holder 47, illustrated in position No. 2, is advanced to position No. 3, the bar 71 is arranged to securely retain the plate 64 in place during the pouring of the sulphur sealing plugs. If it is not desired to employ two of the closure or back-up plates 64, a plate may be removed from position No. 3, after the sealing plugs have properly hardened, and assembled at the No. 2 position. Of course, one group or series of partially formed match heads is advanced to position No. 4 prior to the cutting operation performed at position No. 3. After these various steps have been performed, the crank arm 41 is given two complete revolutions for advancing the wire forming wheel or drum 36 one-tenth of a revolution.

Fig. 20 illustrates the condition of each one of the partially formed match heads as it leaves the wire forming wheel or drum 36. This match head at this time includes the sulphur sealing plug 77 with the two short igniter terminals 78 projecting from one end thereof and the two long lead wires 79 projecting from the other end. Both of the strands of wire are provided with two kinks which are embedded within the sealing plug 77. These two kinks for each wire are clearly illustrated in the sectional view of Fig. 14.

The next step to be performed is to provide the end portion of each of the two lead wires 79 with a tinning coat or covering. The mechanism for accomplishing this tinning step is illustrated in Figs. 18 and 19.

As this invention is not directly concerned with detail features of construction regarding the tinning bath and the apparatus employed for maintaining the molten tin at the desired temperature, the tinning apparatus is only disclosed in a general manner. It includes a suitable casing or housing 80 in which is properly mounted a trough 81. The space between the dipping trough and the housing 80 is completely filled with a suitable insulating material, such as asbestos, 82. Suitable electric heater units 83 extend directly through the molten tin bath 84 within the trough. These heater elements are designed to maintain the molten tin 84 at a temperature of approximately 1000° F.

It will be remembered that the lead wires 79 are still covered with an enamel insulating coating. This coating must be removed before the lead wires can be properly tinned. As this method involves the simultaneous development of fifty-one match heads with their 102 lead wires, the enamel covering must be simultaneously removed from all of the lead wires. It has been found that the enamel covering can be very effectively removed from the lead wires by simultaneously dipping all of the same into the tinning bath 84. The high temperature of this bath very quickly burns the enamel from the lead wires and at the same time applies a partial tinning coat to the wires.

Fig. 18 discloses a group or series of fifty-one partially formed match heads being handled as a unit by means of the mold parts 59 and 61. This unit of match heads is manipulated so that the lead wires 79 will be dipped to a distance of approximately one and one-half inches into the molten tin bath 84. After this dipping operation is performed, and during which the enamel coating is burnt off and a partial tinning coat is applied, the lead wires are given a quick dip in a high grade of liquid soldering flux. A suitable dipping trough for such a flux is disclosed in Figs. 22 and 23. This trough merely includes a tank-like body 84 having top edge flanges 86 by means of which the tank may be rested on any suitable support. Fig. 22 discloses the unit or group of partially formed match heads with all of the lead wires 79 immersed in the bath of flux. The surface of the tinning bath 84 then should be carefully skimmed to remove any impurities, such as the enamel burnt from the lead wires. The lead wires are then slowly immersed to the desired depth in the molten tin bath 84, moved across or in a lateral direction relative to the surface of the bath a short distance and finally very slowly removed from the bath. This entire operation requires approximately 15 seconds to accomplish and results in providing the lead wires 79 with an extremely suitable tinning coat 87, see Fig. 21. After withdrawing the series or group of lead wires 79 from the tinning bath, after applying the desired tinning coating 87, the lead wires immediately should be immersed in the soldering flux, previously referred to in connection with the dipping tank 85, and then thoroughly washed in a water bath to which has been added a small amount of soap to insure an alkaline solution. This alkaline dip is for the purpose of removing any acid which may remain on the wires from the flux. The type of dipping trough or tank disclosed in Figs. 22 and 23 is used to hold this alkaline dip. The lead wires 79 are now completely conditioned and the tinned ends 87 will enable the match head to be quickly and efficiently connected to a suitable source of electricity at the time the match head is placed in use. In other words, the tinned ends 87 make it possible to provide a satisfactory electrical connection with the lead wires of the match heads.

The method now deals with the steps of completing the terminal ends 78 of the match head. A suitable, fusible bridge wire is to be soldered to the end faces of each pair of igniter terminals 78. It will be recalled that the step of severing the wires on the forming wheel or drum 36 provided each terminal wire 78 with a very straight, clean cut. The first step involving the application of a bridge wire to the fifty-one pairs of terminals 78 consists of immersing these terminals in a bath of soldering flux, a bath similar to that disclosed in Figs. 22 and 23. This flux dip should leave a small drop of flux on the end face of each terminal wire 78, and it is very important that the terminal ends of the wires be perfectly free of oil, dirt, or corrosion. The unit or group of partially formed match heads is then positioned on a work table 88 which is provided with an elongated slot or opening 89 adapted to permit the lead wires 79 of the group or unit to pass therethrough. Fig. 24 discloses such a group or unit of partially formed match heads associated with the table 88. The mold members 59 and 61 will rest on the top surface of the table to act as a support for the match heads.

A fine nichrome wire of approximately .002 inch in diameter is used for the bridge wire. A spool 90 of this nichrome wire is supported by a holder 91 on the table 88 in alignment with the positioned group of match heads. The nichrome wire 92 is stretched or positioned over all of the terminal ends 78 of the match heads. Starting with the terminal end 78 farthest removed from the supply spool 90, the nichrome wire 92 is soldered to this first terminal end 78 and then to every fourth or fifth terminal end or pair of terminal ends along the entire group or series. After the single strand of nichrome wire is in this manner anchored or secured throughout the entire length of the group or series of terminal ends, the operator then should complete the soldering of the bridge wire to all of the remaining terminals. An ordinary No. 10 electric soldering iron is entirely satisfactory for this operation and preferably a good grade of 50-50 solder is employed. The nichrome wire 92 is then severed from the source of supply 90 and the assembly of this group of match heads with their nichrome bridge wires is substantially completed.

Fig. 25 is an enlarged view of a section of this group or series of match heads with the nichrome bridge wire 92 soldered at 93 by a drop of solder to each one of the terminal ends 78. Fig. 26 discloses an individual match head at this stage of the development of the method.

The next step in the method results in the simultaneous accomplishment of two purposes. It, of course, is necessary to sever the bridge wire or filament 92 between the pairs of terminal ends 78. It, also, is necessary to provide a small amount of slack in the bridge wire between each of the two terminal ends of a pair so that contraction of the bridge wire under a low temperature will not result in breaking the filament. The slack wire and cut-off tool illustrated in Figs. 27 to 29, inclusive, is employed for carrying out this dual step. This tool consists of a plate or bar 94 which is provided with fifty-one properly spaced apertures or openings 95. These apertures or openings are tapered or of frusto-conical formation, as is illustrated in Figs. 28 and 29. To properly register these apertures with the respective pairs of bridge wire terminals 78, the plate or bar 94 is provided with two dowel pins 96 which are adapted to register with apertures 97 formed in the mold member 59. Fig. 12 clearly illustrates the location of these apertures 97 in the inner mold part 59.

This plate or bar 94 is driven down over the terminal ends 78 and the inner edges 98 of the apertures 95 sever the filament wire 92 at the outer sides of the terminals 78 of each pair. The tapered or conical wall surfaces of these apertures also pinch or squeeze the terminals 78 toward each other.

Fig. 30 illustrates an individual match head conditioned or prepared up to this point in the method. It will be noted that the terminal ends 78 have been crowded toward each other to place a desired amount of slack in the bridge wire 92.

The soldered ends of all of the match heads are dipped in a water and soap solution, after the bridge wire severing and slack producing operation has been performed, to remove any flux acid which may remain, and are then thoroughly dried. A dipping trough or tank of the type disclosed in Figs. 22 and 23 may be employed for this purpose.

It will be appreciated that the nichrome bridge wire 92 offers a sufficient amount of resistance to the passage of an electric current therethrough to effect fusion of the said wire. The heat developed by the fusing of this bridge wire or filament is not sufficient in and of itself to ignite the charge to be set off by the match head. Therefore, it becomes necessary to embed or encase the bridge wire and the adjacent portions of the terminal ends in a body of a low flash point powder mixture. This powder mixture is ignited by the heat developed by the bridge wire. The mixture consists of a dry powder mix which preferably will be formed of 86% potassium chlorate, 12% powdered charcoal, and 2% sulphur. These dry ingredients should be thoroughly mixed in a dry state and then mixed with a binder such as USP collodion in the proportions of approximately 1 part of powder to two parts of collodion. To this mixture is then added about 3% of acetone, which prevents too rapid drying.

This complete mixture must be thoroughly mixed before using, and this mixing is accomplished in the apparatus disclosed in Figs. 31 and 32. This apparatus includes a mixing chamber formed by a cylindrical body 99 which is closed at its lower end by the bottom wall 100. The upper end is closed by a fixed top wall portion 101 and a hinged cover portion 102. A shaft 103 is journaled in a suitable bearing 104 mounted on the top wall portion 101. This shaft extends down almost to the bottom wall 100 and has suitably secured to its lower end portion a rubber paddle blade 105. It is necessary to keep this mixture in a state of agitation at all times to prevent the dry ingredients from settling to the bottom of the receptacle. The paddle blade 105, therefore, should be kept in motion at all times, and it has been found desirable to operate the shaft 103 at a speed of thirty-six revolutions per minute. To accomplish this, beveled pinions 106 connect the upper end of the shaft 103 to a shaft 107 of a suitable reduction gear unit 108 and motor 109. The powder mixture may be withdrawn from the mixing receptacle in any suitable manner, but it has been found to be very desirable and practical to effect discharge of the same through a flexible hose 110, see Fig. 33, which is connected to a nipple 111 projecting from the side wall 99. A control valve 112 is provided at the discharge end of the hose 110 for controlling the flow of the powder mixture through the hose. Preferably, the valve 112 should take the form of a pinch cock.

The powder mixture is discharged or delivered to the dipping groove 113 formed in the member 114. This member preferably takes the form of a soft pine board, and the groove should be one-quarter of an inch deep and three-sixteenths of an inch wide. This shallow and narrow type of groove 113 has been found to be very desirable as it prevents excessive drying of the mixture during the dipping operation and it saves to a considerable extent the amount of powder required for each dipping operation. This saving in powder will be understood when it is appreciated that any powder remaining in the groove 113 after dipping of one group or unit of match heads must be discarded and a fresh charge of powder be used for the next group or series.

Figs. 36 to 38, inclusive, disclose mechanism which is employed for effecting dipping of the bridge wires and their supporting terminals of a group or unit of match heads. It is essential that the match heads be maintained in a truly perpendicular position during the dipping operation. Furthermore, it is necessary to dip each group or series of match heads in the powder mixture several times to provide the desired amount or body of powder on each match head terminal and bridge wire. The trough board 114 is provided at each of its ends with an aperture 115 which, as is clearly shown in Fig. 38, receives positioning pins 116 projecting from the surface of a bench or table 117.

The dipping is accomplished by means of a parallelogram mechanism. A pair of mounting brackets 118 secured to a perpendicular support 119 function to mount two parallel shafts 120 in vertically spaced relation, as is clearly illustrated in Fig. 36. A spacer sleeve 121 is mounted on the intermediate portion of each shaft 120. Pivotally connected to each shaft are a pair of arms 122. The pivoted ends of these arms are maintained in proper spaced relation by means of the spacer sleeves 121. Crossed braces 123 are provided for each pair of arms 122. The outer ends of these arms have mounted therein the parallel shafts 124. Spacer sleeves 125 also are mounted on the shafts 124 to maintain the arms 122 properly spaced. A link 126 is arranged at each side of the parallelogram, and each link 126 is connected to both of the shafts 124. The distance between the axes for the shafts 124 is the same as the distance between the axes for the shafts 120. Therefore, any vertical movement of the links 126 will result in these links being retained truly perpendicular of the bench or table 117.

The lower, depending end of each link 126 has a bracket or shoe 127 mounted thereon. The upper face of each one of these brackets or shoes is provided with three shoulders or abutments 128 which are arranged, as is best illustrated in Figs. 37 and 38, to receive the adjacent ends of the mold parts 59 and 61 in which the series or group of match heads is still held. This parallelogram dipping mechanism should be counterbalanced in any way found most desirable, and such counterbalancing mechanism is diagrammatically or generally represented by the vertically extending cable 129 in Fig. 36.

As has been indicated above, it is found necessary to use about four separate dips for each group or series of match heads with a suitable drying period between each dip. The first dip will provide a covering of powder which will bridge between the terminal ends of the wires and will enclose the bridge wire. The succeeding three dips will bring the powder mass to the desired size.

Fig. 36 discloses the parallelogram mechanism in full line in its dipping position. After each dipping operation, the mechanism is moved into the dash line position where the dipped terminals of the various match heads will be elevated a suitable distance above the dipping board 114. The match heads are to be dried in this elevated position. This drying is accomplished by means of an elongated nozzle 130 which delivers a blast of air on to the dipped terminals and with the blast of air being provided by any suitable fan or blower unit 131.

Fig. 39 discloses an individual match head prepared up to this point. It will be noted that the extremities of the terminal wires 78 and the bridge wire 92 are encased in the mass of powder 132. This mass is entirely disconnected from the sealing plugs 77 by the remaining exposed portions of the terminals 78 which, it will be remembered, are still insulated by the enamel coating or covering.

The final step in the production of these match heads is the dipping of the powder embedded portions of the terminal ends in a liquid designed to prevent the absorption of moisture by the match head and also to add strength to the head. This moisture-proofing and strengthening material preferably consists of 90% flexible collodion to which is added 10% of ordinary red paint. This red paint, or any other suitable coloring material, is used solely for the purpose of indicating to operators, and the like, that a moisture-proof covering has been applied to the match heads. It has been determined that a stronger, more serviceable powder covering can be provided if the head has applied thereto an additional coat of collodion. The additional collodion layer should be applied between any desired succeeding layers of powder.

The actual dipping in the moisture-proof material is accomplished with the aid of a steel bar 133 which is provided with a shallow groove 134 that is filled with the moisture-proofing material. A group or series of match heads, still held by the molding parts 59 and 61, are dipped into the groove 134 to apply this moisture-proof, final covering. Immediately after the dipping operation is performed, the unit of match heads is placed to one side so that the moisture-proofing material may dry. This drying requires approximately five minutes.

The mechanism disclosed in Figs. 36 to 38, inclusive, is entirely suitable for accomplishing dipping of the bridge wires and their supporting terminals in the powder mixture and results in the formation of entirely satisfactory match heads if it is properly operated. The difficulty experienced with this dipping apparatus and method is due to the fact that the extent to which each series or groups of match heads is subjected to the drying blast of air is dependent entirely upon the judgment of the operator. If too much time is allowed, the production rate suffers. On the other hand, any powder layer which is not allowed to properly dry before it is sealed in a subsequent layer is very likely to produce an imperfect match. The drying of each layer is accompanied by the liberation of vapors; for example, those of the solvents for the collodion, and if these vapors are trapped, blisters or bubbles will form. These gas pockets may be sufficient to prevent proper ignition of the powder when the bridge wire is fired. They also reduce the strength of the head. Figs. 43 to 45, inclusive, disclose a modified form of match head dipping mechanism which dispenses with the need for a forced blast of air to effect drying of the powder on the individual groups or series of match heads after each dipping operation and acts to automatically time the subsequent dipping operations.

Figs. 43 and 44 disclose this modified form of match head dipping mechanism associated with a table, or the like, 135 which is mounted or supported a suitable distance above the floor level 136. Suitably secured to the table, or the like, 135 is an upright 137 to which the laterally spaced truss-like frames 138 are secured. These frames include the horizontally extending, top bars 139 which project beyond the diagonal brace members 140 and are supported at their outer end portions by the latter. Each one of these frames 138 has mounted on the upper surface of its extremity a shaft bearing 141.

Journaled in these bearings is a horizontal shaft 142 which has mounted thereon, adjacent the bearings 141, the disc-like heads 143. These heads may be formed of any suitable material, such as wood. Each head is secured by a series of bolts 144 to the flange portion 145 of a metallic hub 146. The hubs are keyed or fastened to the shaft 142 by set screws 147.

As will be explained at a later point, it is desirable to retain these simultaneously rotatable heads 143 locked or secured in a predetermined number of positions. To accomplish this desired result, one of the hub flanges 145 has secured thereagainst, by means of the bolts 144, a metallic disc or plate 148 which is provided with the desired number of equi-spaced apertures 149. The top bar 139 of the frame 138 adjacent the apertured disc or plate 148 has secured thereto the housing portion 150 of a sliding bolt 151. This bolt may be manually manipulated by the operating knob 152. A spring 153 is employed for normally urging the bolt 151 into its projected position where its outer end will enter one of the apertures 149. By positioning the bolt 151 successively in the several apertures 149, the heads 143 may be retained in a desired number of predetermined positions, in the present illustration, twelve desired positions being illustrated.

The heads 143 are illustrated as having formed in the peripheries of the same the twelve notches or recesses 154; i. e., each head 143 being provided with twelve of these notches or recesses. The notches or recesses 154 in the said heads are axially aligned with respect to each other. Each notch or recess 154 for one of the heads 143 has associated therewith an angularly shaped, fixed fastening member or hook 155. Each one of the notches or recesses 154 for the other head 143 has associated therewith the angularly shaped extremity 156 of a spring pressed bolt 157. These notches or recesses 154 and the fastening members 155 and 157 function to receive and hold the opposite end portions of the mold parts 59 and 61 which support the group or series of match heads. Fig. 44 illustrates one such group or series of match heads mounted on the supporting heads or discs 143 with the short terminal ends 78 of the match head projecting outwardly and with the lead wires 79 projecting truly radially inwardly toward the shaft 142. It is to be understood that each aligned pair of recesses or notches 154 is to have mounted therein the mold parts 59 and 61 holding a group or series of match heads during the normal operation of this dipping mechanism. The molding parts 59 and 61 with their supported group or series of match heads may be easily and quickly mounted on and removed from the peripheries of the said disc heads 143 by manipulation of the bolts 157.

The powder mixture is applied to the successively positioned groups or series of match heads by means of a grooved trough 158 which is removably received within the channel 159 formed in the horizontally extending, holding bar 160. This bar is mounted on the extremities of a pair of lever arms 161 which are pivoted at their inner ends on brackets 162 mounted on the uprights 137. The lever arms 161, which may take the form of angle irons, are pivotally connected to the upper ends of links 163, also formed of angle iron stock, which extend through an elongated opening 164 formed in the table, or the like, 135. The lower ends of these links 163 are pivotally connected to the side bars 165 of a treadle 166. These side bars 165 of the treadle are pivoted at 167 to supporting brackets 168 which are mounted on and secured to the floor 136. Suitable crossed brace members 169, 170, and 171 may be provided for strengthening the lever arms 161, the links 163, and the treadle 166, respectively.

Figs. 43 and 44 disclose the dipping trough 158 in position to apply the powder mixture to the group or series of match heads located at the bottom dead center of the supporting heads 143. The dipping trough 158 has been moved into this position by manipulation of the treadle 166; i. e., the treadle has been pivoted to swing the lever arms 161 with the dipping trough 158 upwardly about the pivotal axes for the lever arms. After the match heads have been properly dipped in the powder mixture, the dipping trough 158 is allowed to move downwardly away from the match heads. If desired, a fresh charge of powder mixture may be placed in the groove of the dipping trough while in its lowered position so that powder will be available for application to the next series or group of match heads moved into the bottom dead center position. By advancing the supporting heads 143 in step by step manner into and out of the bottom dead center, dipping position, the match heads at all of the twelve operating positions of the heads 143 may be dipped. Any desired sequence of operations may be performed by means of this dipping mechanism. It has been determined that by the time one group or series of match heads has been dipped and moved through the remaining eleven positions of rest the applied powder mixture has been given time to thoroughly dry and the match heads may have applied thereto a second coating of powder, or the like. It will be appreciated that each group or series of match heads may be caused to move any desired number of times around the circular path defined by the peripheries of the supporting heads 143 and into the bottom dead center dipping position for applying the desired number of coats of powder. Completed groups of match heads may be separated from the supporting discs or heads 143 at any desired or selected stopping position of the heads and a new or undipped group or series of match heads substituted for the completed heads.

It will be appreciated that the match heads may be supplied with any desired number of coats or layers of collodion as well as the coats or layers of powder by substituting a collodion dipping trough for the powder dipping trough. Any suitable stop mechanism may be employed for limiting the up and down movements of the lever arms 161 during the dipping operation.

The actual production of the match heads by this novel method has now been fully carried out. The individual match heads are released from the molding parts 59 and 61, and each match head takes the form illustrated in detail in Fig. 42 wherein the reference character 172 designates the moisture-proof covering or coating. It will be noted that this covering or coating 172 is kept entirely spaced from the sealing plug 77 so that short lengths of the enamel insulated terminals 78 remain exposed.

Each match head is now tested to make certain that there are no broken bridge wires, no short circuits, and that the resistance of each match is such that it will properly ignite at the time of use. The match heads which have passed this final inspection and test may then be bundled in groups of any desired number and packed for shipment.

It will be appreciated from the above set forth description that the match heads are entirely formed either in a continuous manner, as by means of the wire working apparatus disclosed in Figs. 1 and 2, or by being manipulated and handled in groups or succeeding series. Although the process has been specifically described wherein fifty-one match heads are handled as a unit, it will be appreciated that either a larger or smaller number of match heads may be treated simultaneously as a group or unit. Other changes or modifications of the process step may be resorted to without departing from the spirit of the invention or the scope of the subjoined claims.

Having thus described the invention, we claim:

1. The method of making electrically ignited match heads which comprises the steps of assembling in web form a multiplicity of wire strands, intermittently advancing said web through several operating positions which are uniformly spaced from each other and with the spacing corresponding with the length of the wires of finished match heads, kinking all of said strands at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, simultaneously tinning the end portions of all of said lead wires, attaching a continuous strand of fine wire to all of the bridge wire terminals of a unit, cutting the continuous strand of fine wire from between the terminals of adjacent sealing plugs to leave a bridge wire section only between the terminals of each plug, pinching the terminals for each plug toward each other to provide slack in the individual bridge wires, depositing an encasing body of powder material on each bridge wire and its terminals, coating said powder deposit with a moisture-proofing material, and finally separating the completed match heads of the unit from their mold device.

2. The method of making electrically ignited match heads which comprises the steps of assembling in web form a multiplicity of wire strands, intermittently advancing said web through several operating positions while maintaining all of the strands under uniform tension and with the dwell between succeeding advancements being of sufficient duration to permit performing an operation at each of said positions, kinking all of said strands in the same direction at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, tinning the end portions of all of said lead wires, attaching a continuous strand of fusible wire to all of the bridge wire terminals of a unit, cutting the continuous strand of fusible wire from between the terminals of adjacent sealing plugs to leave a bridge wire section only between the terminals of each plug, pinching the terminals for each plug toward each other to provide slack in the individual bridge wires, depositing an encasing body of powder material on each bridge wire and its terminals, coating said powder deposit with a moisture-proofing material, and finally separating the completed match heads of the unit from their mold device.

3. The method of making electrically ignited match heads which comprises the steps of assembling in web form a multiplicity of wire strands, intermittently advancing said web through several operating positions, simultaneously kinking all of said strands at a first operating position, enclosing the kinked portions of the strands at a second operating position in a single mold device having a mold cavity for every two strands, at a third operating position pouring a quick setting plastic material into each mold cavity to embed previously kinked portions of each pair of strands in a sealing plug, severing all of the strands at the third operating position to provide short bridge wire terminals in advance of the sealing plugs at the third operating position and to provide relatively long lead wires rearwardly of the several plugs in a fourth operating position, advancing the sealing plugs with their bridge wire terminals and lead wires from said fourth operating position through the subsequent steps of the method assembled as a unit with their mold device, simultaneously tinning the end portions of all of said lead wires, attaching a continuous strand of fusible wire to all of the bridge wire terminals of a unit, cutting the continuous strand of fusible wire from between the terminals of adjacent sealing plugs to leave a bridge wire section only between the terminals of each plug and simultaneously with said cutting operation pinching the terminals of each plug toward each other to provide slack in the individual bridge wires, simultaneously depositing an enclosing body of powder material on each bridge wire and its terminals, simultaneously coating said powder deposit with a moisture-proofing material, and finally separating the completed match heads of the unit from their mold device.

4. The method of making electrically ignited match heads which comprises the steps of assembling in web form a multiplicity of wire strands, intermittently advancing said web through several operating positions with the dwell between succeeding advancements being of sufficient duration to permit performing an operation at each of said positions, simultaneously kinking all of said strands at a first operating position, enclosing the kinked portions of the strands at a second operating position in a single mold device having a mold cavity for every two strands, at a third operating position pouring a quick setting plastic material into each mold cavity to embed previously kinked portions of each pair of strands in a sealing plug, severing all of the strands at the third operating position to provide short bridge wire terminals in advance of the sealing plugs at the third position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, simultaneously tinning the end portions of all of said lead wires, attaching a continuous strand of fine wire to all of the bridge wire terminals of a unit, simultaneously cutting the continuous strand of fine wire from between the terminals of adjacent sealing plugs to leave a bridge wire section only between the terminals of each plug and pinching the terminals for each plug toward each other to provide slack in the individual bridge wires, simultaneously depositing an encasing body of powder material on each bridge wire and its terminals, simultaneously coating said powder deposit with a moisture-proofing material, and finally separating the completed match heads of the unit from their mold device.

5. The method of making electrically ignited match heads which comprises the steps of assembling in web form a multiplicity of enamel covered wire strands, intermittently advancing said web through several operating positions, kinking all of said strands at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, burning the enamel covering from the end portions of all of the lead wires and tinning the thus exposed portions, soldering a continuous strand of fine wire to all of the bridge wire terminals of a unit, cutting the continuous strand of fine wire from between the terminals of adjacent sealing plugs to leave a bridge wire section only between the terminals of each plug, pinching the terminals for each plug toward each other to provide slack in the individual bridge wires, depositing an encasing body of powder material on each bridge wire and its terminals with the body spaced from the adjacent surface of the plug to leave exposed sections of enameled wire, coating said powder deposit with a moisture-proofing material, and finally separating the completed match heads of the unit from their mold device.

6. The method of making electrically ignited match heads which comprises the steps of assembling in web form a multiplicity of wire strands, intermittently advancing said web through several operating positions, simultaneously forming a double kink in each of said strands at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, tinning the end portions of all of said lead wires, attaching a continuous strand of fine wire to all of the bridge wire terminals of a unit, cutting the continuous strand of fine wire from between the terminals of adjacent sealing plugs to leave a bridge wire section only between the terminals of each plug and during the same operation effecting pinching of the terminals of each plug toward each other to provide slack in the individual bridge wires, depositing an encasing body of powder material on each bridge wire and its terminals, coating said powder deposit with a moisture-proofing material, and finally separating the completed match heads of the unit from their mold device.

7. The method of making electrically ignited match heads which comprises the steps of assembling in web form a multiplicity of wire strands, intermittently advancing said web through several operating positions while maintaining all of said strands taut and under uniform tension, kinking all of said strands simultaneously and in the same direction at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position with each of the terminals having a clean straight end surface which is normal to the axis of the terminal, and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, tinning the end portions of all of said lead wires, attaching a continuous strand of fine wire to all of the bridge wire terminals of a unit, simultaneously cutting the continuous strand of fine wire from between the terminals of adjacent sealing plugs to leave a bridge wire section only between the terminals of each plug and as a result of the same operation effecting simultaneous pinching of the terminals for each plug toward each other to provide slack in the individual bridge wires, depositing an encasing body of powder material on each bridge wire and its terminals, coating said powder deposit with a moisture-proofing material, and finally separating the completed match heads of the unit from their mold device.

8. The method of making electrically ignited match heads which comprises the steps of assembling in web form a multiplicity of wire strands, intermittently advancing said web through several operating positions while maintaining all of said strands taut and under uniform tension, kinking all of said strands simultaneously and in the same direction at a first operating position, enclosing the kinked portions of the strands at a second operating position in a mold device having a mold cavity for every two strands, at a third operating position pouring a quick setting plastic material into each mold cavity to embed kinked portions of each pair of strands in a sealing plug, severing all of the strands at the third operating position to provide short bridge wire terminals in advance of the sealing plugs at the third operating position and to provide relatively long lead wires rearwardly of the sealing plugs in a fourth operating position, advancing the sealing plugs with their bridge wire terminals and lead wires from said fourth operating position through the subsequent steps of the method assembled as a unit with their mold device, tinning the end portions of all of said lead wires, attaching a continuous strand of fine wire to all of the bridge wire terminals of a unit, cutting the continuous strand of fine wire from between the terminals of adjacent sealing plugs to leave a bridge wire section only between the terminals of each plug and as a part of the same operation pinching the terminals for each plug toward each other to provide slack in the individual bridge wires, repeatedly dipping all of the bridge wires and the adjacent portions of their terminals in a low flash point powder mixture to build up an encasing body of desired size and drying the deposited material after each dipping operation, coating said powder deposit with a moisture-proofing material, and finally separating the completed match heads of the unit from their mold device.

9. In the art of making electrically ignited match heads the method which comprises the steps of intermittently advancing a pair of uniformly tensioned enamel insulated wires through several operating positions, simultaneously kinking both of said strands in the same direction at a first operating position, enclosing the kinked portions of the strands at a second operating position in a mold cavity, at a third operating position pouring a quick setting plastic material into the mold cavity to embed the kinked portions of the strands in a sealing plug, severing the strands at the third operating position to provide short bridge wire terminals in advance of the sealing plug at the third operating position and to provide relatively long lead wires rearwardly of the sealing plug in a fourth operating position, burning the enamel covering from the end portions of the lead wires and tinning the end portions of the said lead wires by dipping the lead wires in a hot tinning bath, attaching a strand of fine wire to the bridge wire terminals of the plug, simultaneously trimming the bridge wire from the outer sides of the terminals, pinching the terminals for the plug toward each other to provide slack in the bridge wire, depositing an encasing body of powder material on the bridge wire and its terminals, and coating said powder deposit with a moisture-proofing material.

10. In the art of making electrically ignited match heads the method which comprises the steps of assembling on the periphery of a forming drum a multiplicity of parallel wire strands, rotating said drum step by step to advance said parallel strands through several operating positions and to maintain all of said strands under proper uniform tension, simultaneously kinking all of said strands at a first operating position, enclosing the kinked portions of the strands at a second operating position in a mold device having a mold cavity for every two strands, at a third operating position, where the mold cavities have assumed substantially a vertical position, pouring a quick setting plastic material into each mold cavity to embed the kinked portions of each pair of strands in a sealing plug, and severing all of the strands at the third operating position to provide short bridge wire terminals in advance of the sealing plugs at the third operating position and to provide relatively long lead wires rearwardly of the sealing plugs in a fourth operating position, the sealing plugs with their bridge wire terminals and lead wires at said fourth operating position being removed from the periphery of the forming drum still associated with their mold device for subsequent manipulation and treatment as a unit.

11. In the art of making electrically ignited match heads the method which comprises the steps of assembling in web form a multiplicity of wire strands, intermittently advancing said web while maintaining all of the strands under uniform tension through several operating positions arranged at equally spaced points along an arcuate path, simultaneously kinking all of said strands at a first operating position, enclosing the kinked portions of the strands at a second operating position in a mold device having a mold cavity for every two strands, at a third operating position pouring a quick settling plastic material into each mold cavity to embed kinked portions of each pair of strands in a sealing plug, and twice severing all of the strands at the third operating position to provide short bridge wire terminals in advance of the sealing plugs at the third operating position and to provide relatively long lead wires rearwardly of the sealing plugs in a fourth operating position and with the ends of all of the terminals and leads being squared as a result of the double cutting.

12. In the art of making electrically ignited match heads the method which comprises the steps of supporting a row of bridge wire terminals projecting in pairs from a plurality of sealing plugs with the said terminals projecting perpendicularly, laying a strand of fine wire the whole length of said row in contact with the end faces of all of the terminals, soldering the strand to each terminal end, and simultaneously cutting the strands of fine wire from between the pairs of terminals of adjacent sealing plugs to leave a bridge wire section only between the terminals of each plug.

13. In the art of making electrically ignited match heads the method which comprises the steps of supporting a row of bridge wire terminals projecting in pairs from a plurality of sealing plugs with the said terminals projecting perpendicularly, laying a strand of fine wire the whole length of said row in contact with the end faces of all of the terminals, soldering the strand to each terminal end, simultaneously cutting the strands of fine wire from between the pairs of terminals of adjacent sealing plugs to leave a bridge wire section only between the terminals of each plug and at the same time simultaneously pinching the terminals for each plug toward each other to provide slack in the individual bridge wires.

14. In the art of making electrically ignited match heads the method which comprises the steps of supporting a row of bridge wire terminals projecting in pairs from a plurality of sealing plugs with the said terminals projecting perpendicularly, laying a strand of fine wire the whole length of said row in contact with the end faces of the terminals, soldering the strand to the end faces of several of the terminals spaced along and starting at one end of the row to position the strand relative to all of the terminals and then soldering the strand to the end face of each one of the remaining terminals and simultaneously cutting the strand of fine wire from between the pairs of terminals of adjacent sealing plugs to leave a bridge wire section only between the terminals of each plug.

15. In the art of making electrically ignited match heads the method which comprises the steps of supporting a row of bridge wire terminals projecting in pairs from a plurality of sealing plugs with the said terminals projecting perpendicularly, laying a strand of fine wire the whole length of said row in contact with the end faces of the terminals, soldering the strand the end faces of several of the terminals spaced along and starting at one end of the row position the strand relative to all of the terminals and then soldering the strand to the end face of each one of the remaining terminals simultaneously cutting the strand of fine wire from between the pairs of terminals of adjacent sealing plugs to leave a bridge wire section only between the terminals of each plug, and concurrently with the cutting operation simultaneously pinching the terminals for each plug toward each other to provide slack in the individual bridge wires.

16. Apparatus to be used in the making electrically ignited match heads comprising frame for supporting a multiplicity of spools wire, means for guiding the wire from the several spools into a continuous web, a drum rotatably supported on one end portion of the frame a plurality of equally spaced holders secured the periphery of the drum to extend axially thereof, means for intermittently advancing the drum a distance equal to the space between the centers of adjacent holders, and means to successively operatively associated with different ones of said holders in a predetermined sequence for kinking all of the wire strands at proper intervals and for subsequently embedding the kinked portions of the strands in sealing plugs during each dwell between advancements of the drum.

CLARENCE H. CAUGHEY.
WALTER F. MITCHELTREE.